US012221938B2

(12) United States Patent
Kozato et al.

(10) Patent No.: US 12,221,938 B2
(45) Date of Patent: Feb. 11, 2025

(54) ENGINE CYLINDER BLOCK STRUCTURE

(71) Applicant: Yanmar Co., Ltd., Osaka (JP)

(72) Inventors: Koichi Kozato, Osaka (JP); Hiroaki Naganawa, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 591 days.

(21) Appl. No.: 16/090,462

(22) PCT Filed: Mar. 15, 2017

(86) PCT No.: PCT/JP2017/010492
§ 371 (c)(1),
(2) Date: Oct. 1, 2018

(87) PCT Pub. No.: WO2017/169803
PCT Pub. Date: Oct. 5, 2017

(65) Prior Publication Data

US 2019/0113000 A1 Apr. 18, 2019

(30) Foreign Application Priority Data

Mar. 31, 2016 (JP) ................................ 2016-072274
Mar. 31, 2016 (JP) ................................ 2016-072275

(51) Int. Cl.
*F02F 7/00* (2006.01)
*F01M 11/02* (2006.01)
*F02F 1/00* (2006.01)

(52) U.S. Cl.
CPC ........... *F02F 7/0043* (2013.01); *F01M 11/02* (2013.01); *F02F 1/00* (2013.01); *F02F 7/00* (2013.01);
(Continued)

(58) Field of Classification Search
CPC .... F02F 7/00; F02F 2007/0097; F02F 7/0082; F02F 2007/0056; F02F 7/0029;
(Continued)

(56) References Cited

U.S. PATENT DOCUMENTS 4,059,085 A * 11/1977 Mansfield ................ F02B 7/00 123/195 R
6,216,658 B1 4/2001 Pierro et al.
(Continued)

FOREIGN PATENT DOCUMENTS

DE 2429404 A1 * 1/1975 ........... F02F 7/0029
EP 0647772 A1 4/1995
(Continued)

OTHER PUBLICATIONS

Machine Translation of WO2012108652A2 PDF file name: "WO2012108652A2_Machine_Translation.pdf".*
(Continued)

*Primary Examiner* — Grant Moubry
*Assistant Examiner* — Ruben Picon-Feliciano
(74) *Attorney, Agent, or Firm* — NORTON ROSE FULBRIGHT US LLP

(57) ABSTRACT

An engine device including a cylinder block for supporting a crankshaft so that the crankshaft is rotatable. Opposite side portions of the cylinder block along a crankshaft axial direction have, on one of their ends relative to the crankshaft axial direction, projecting portions protruding in a direction away from the crankshaft, and reinforcing ribs provided between side walls and the projecting portions of the opposite side portions so that the reinforcing ribs are widened at their sides close to the corresponding projecting portions, the projecting portions and the reinforcing ribs being integrally formed with the cylinder block.

20 Claims, 19 Drawing Sheets

(52) U.S. Cl.
CPC .......... *F02F 7/0021* (2013.01); *F02F 7/0068* (2013.01); *F02F 7/0073* (2013.01); *F02F 7/0082* (2013.01)

(58) Field of Classification Search
CPC .. F02F 1/10; F02F 7/0068; F02F 7/007; F01P 2003/021; F01P 3/02; F01P 5/12; F02B 61/06; F02B 67/00; F02B 67/08; F02D 41/3809; F02M 2200/247; F02M 2200/248; F02M 2200/857; F02M 26/17; F02M 35/104; F02M 39/00; F02M 51/005; F02M 55/025; F02M 63/0265; F02M 63/0275; F02M 69/465
See application file for complete search history.

(56) References Cited

U.S. PATENT DOCUMENTS

| | | | | |
|---|---|---|---|---|
| 6,286,475 B1 * | 9/2001 | Pierro | F02B 75/20 | 123/195 A |
| 6,530,356 B2 * | 3/2003 | Inoue | F01M 11/02 | 123/196 R |
| 2010/0288214 A1 * | 11/2010 | Pelmear | F01M 1/02 | 123/197.4 |

FOREIGN PATENT DOCUMENTS

| | | | | | |
|---|---|---|---|---|---|
| JP | 1984-052060 U | | 4/1984 | | |
| JP | 11-117806 A | | 4/1999 | | |
| JP | 2000-064903 A | | 3/2000 | | |
| JP | 2000282953 A | | 10/2000 | | |
| JP | 2002-115522 A | | 4/2002 | | |
| JP | 2002168106 A | | 6/2002 | | |
| JP | 2002-227719 A | | 8/2002 | | |
| JP | 2011112014 A | * | 6/2011 | | |
| JP | 2011252480 A | | 12/2011 | | |
| JP | 2012-189027 A | | 10/2012 | | |
| WO | 02/073021 A1 | | 9/2002 | | |
| WO | WO-2010082418 A1 | * | 7/2010 | | F02F 7/0068 |
| WO | WO-2012108652 A2 | * | 8/2012 | | F01L 1/047 |

OTHER PUBLICATIONS

Machine Translation of DE2429404A1 PDF file name: "DE2429404A1_Machine_Translation.pdf".*
Machine Translation of WO2010082418A1 PDF File Name: "WO2010082418A1_Machine_Translation.pdf".*
Machine Translation of JP 2011112014 A PDF File Name: "JP2011112014A_Machine_Translation.pdf".*
International Search Report dated May 30, 2017 issued in corresponding PCT Application PCT/JP2017/010492.
Supplementary European Search Report dated 2019-02-19 issued in corresponding EPC Application No. 17774347.3.
Korean Office Action dated Aug. 26, 2019 issued in KR Application No. 10-2018-7022567.
Korean Office Action dated Jun. 5, 2020 issued in KR Application No. 10-2020-7012609.
Korean Office Action dated May 20, 2021 issued in KR Application No. 10-2021-7005653.
Korean Office Action dated Dec. 7, 2022 issued in KR Application No. 10-2022-7029310.

* cited by examiner

ENGINE CYLINDER BLOCK STRUCTURE

CROSS REFERENCE TO RELATED APPLICATIONS

This application is a national stage application pursuant to 35 U.S.C. § 371 of International Application No. PCT/JP2017/010492, filed on Mar. 15, 2017, which claims priorities under 35 U.S.C. § 119 to Japanese Patent Application No. 2016-072274 filed on Mar. 31, 2016 and Japanese Patent Application No. 2016-072275 filed on Mar. 31, 2016, the disclosures of which are hereby incorporated by reference in their entireties.

TECHNICAL FIELD

The present invention relates to an engine device, and more specifically, relates to an engine device including a cylinder block pivotally supporting a crankshaft so that the crankshaft is rotatable,

BACKGROUND ART

An engine device including a cylinder block pivotally supporting a crankshaft so that the crankshaft is rotatable has been known (e.g., see Patent Literature 1; hereinafter, PTL 1). The cylinder block is one of media that transmits force of explosion to a crank system, and is one of most important strength member that has to support the inertia load of the crank system. The structure of such a cylinder block largely affects the size, the weight, the overall durability, the noise, and the like of the engine.

CITATION LIST

Patent Literature

PTL 1: Japanese Patent Application Laid-Open No. 2012-189027

SUMMARY OF INVENTION

Technical Problem

Traditionally, the rigidity of a cylinder block is improved mostly by increasing the thickness of the cylinder block. Increasing the thickness of the cylinder block however leaves a problem that the rigidity improvement rate against an increase in the weight is low. Such a problem becomes conspicuous in a work machine such as a tractor which uses an engine device as a rigid member of a vehicle body frame.

In view of the problem, an object of the present invention is to improve the rigidity of the cylinder block.

Solution to Problem

An engine device related to an aspect of the present invention is an engine device including a cylinder block pivotally supporting a crankshaft so that the crankshaft is rotatable, opposite side portions of the cylinder block along a crankshaft axial direction have, on one of their ends relative to the crankshaft axial direction, projecting portions protruding in a direction away from the crankshaft, and reinforcing ribs provided between side walls and the projecting portions of the opposite side portions so that the reinforcing ribs are flared at their sides close to the corresponding projecting portions, the projecting portions and the reinforcing ribs being integrally formed with the cylinder block.

The engine device of the above aspect of the present invention may be such that, for example, a camshaft casing for accommodating a camshaft is provided inside the cylinder block and is arranged at a position relatively close to one side portion out of the opposite side portions, along the crankshaft axial direction; and the reinforcing ribs are arranged close to a position where the camshaft casing is disposed in a side view, on the one side portion.

Further, for example, the reinforcing ribs may be arranged so as to overlap the position where the camshaft casing is disposed in a side view.

Further, for example, each of the reinforcing ribs may extend along the crankshaft axial direction to a position close to another end opposite to the one end relative to the crankshaft axial direction.

Further, the engine device of the above aspect of the present invention may be such that, for example, an auxiliary machine is attached to the projecting portions, and the reinforcing ribs are arranged immediately below the auxiliary machine.

Further, the engine device of the above aspect of the present invention may be such that of a lubricating oil passage provided in the cylinder block, a part is disposed in a position relatively close to one side portion out of the opposite side portions, and the reinforcing ribs are arranged close to a position where the part of the lubricating oil passage is disposed in a side view.

Further, for example, the reinforcing ribs and the part of the lubricating oil passage may extend in the direction along the crankshaft axial direction.

Further, for example, the reinforcing ribs may be arranged so as to overlap the position where the part of the lubricating oil passage is disposed in a side view.

Further, in a structure where the part of the lubricating oil passage is arranged in a position relatively close to the one side portion in the cylinder block, an auxiliary machine may be attached to the projecting portions, and the reinforcing ribs are arranged immediately below the auxiliary machine.

Advantageous Effects of Invention

In the engine device of the above aspect of the present invention, opposite side portions of the cylinder block along a crankshaft axial direction have, on one of their ends relative to the crankshaft axial direction, projecting portions protruding in a direction away from the crankshaft, and reinforcing ribs provided between side walls and the projecting portions of the opposite side portions so that the reinforcing ribs are flared at their sides close to the corresponding projecting portions, the projecting portions and the reinforcing ribs being integrally formed with the cylinder block. In addition to improvement in the rigidity of the cylinder block by the projecting portions, the rigidity can be further improved by the reinforcing ribs. Therefore, the rigidity of the cylinder block can be improved, consequently improving the rigidity of the entire engine. Further, the projecting portions and the reinforcing ribs increases the surface area of the cylinder block, which improves the heat dissipation performance. Thus, the engine device of the above aspect of the present invention can improve the cooling efficiency of the cylinder block, consequently improving the cooling efficiency of the entire engine.

Further, in the engine device of the above aspect of the present invention, a camshaft casing for accommodating a camshaft is provided inside the cylinder block and is arranged at a position relatively close to one side portion out of the opposite side portions, along the crankshaft axial direction; and the reinforcing ribs are arranged close to a position where the camshaft casing is disposed in a side view, on the one side portion. With this, the rigidity of portions around the camshaft casing can be improved, and deformation of the camshaft casing can be prevented. Therefore, rotation failure of the camshaft caused by deformation of the camshaft casing can be prevented.

Further, by arranging the reinforcing ribs so as to overlap the position where the camshaft casing is disposed in a side view, the rigidity of portions around the camshaft casing can be further improved by the reinforcing ribs, and rotation failure of the camshaft caused by deformation of the camshaft casing can be prevented.

Further, by extending each of the reinforcing ribs along the crankshaft axial direction to a position close to another end opposite to the one end relative to the crankshaft axial direction, the reinforcing ribs can be arranged along the camshaft casing, and deformation of the camshaft casing can be prevented throughout the entire position where the camshaft casing is disposed.

Further, in the engine device of the above aspect of the present invention, an auxiliary machine is attached to the projecting portions, and the reinforcing ribs are arranged immediately below the auxiliary machine. This way, the reinforcing ribs function as protection members for the auxiliary machine, and the auxiliary machine can be prevented from being contacted by a foreign object coming from below, thus preventing damages and adhesion of dirt to the auxiliary machine, caused by contact of a foreign object.

Further, in the engine device of the above aspect of the present invention, a part of a lubricating oil passage provided in the cylinder block is disposed in a position relatively close to one side portion out of the opposite side portions, and the reinforcing ribs are arranged close to a position where the part of the lubricating oil passage is disposed in a side view, on the one side portion. With this, heat dissipation performance can be improved near the part of the lubricating oil passage by the reinforcing ribs, and the lubricating oil passing inside the part of the lubricating oil passage can be cooled. Hence the cooling efficiency of the cylinder block can be improved, consequently enabling improvement of the cooling efficiency of the entire engine.

Further, by extending the reinforcing ribs and the part of the lubricating oil passage in the direction along the crankshaft axial direction, the reinforcing ribs can be arranged along the part of the lubricating oil passage, and the lubricating oil passing inside the part of the lubricating oil passage can be more efficiently cooled.

Further, by arranging the reinforcing ribs close to a position where the part of the lubricating oil passage is disposed in a side view, on the one side portion, the reinforcing ribs can be arranged closer to the part of the lubricating oil passage, and the heat dissipation performance can be further improved near the part of the lubricating oil passage.

Further, in a structure where the part of the lubricating oil passage is arranged in a position relatively close to the one side portion in the cylinder block, an auxiliary machine is attached to the projecting portions, and the reinforcing ribs are arranged immediately below the auxiliary machine. This way, the reinforcing ribs function as protection members for the auxiliary machine, and the auxiliary machine can be prevented from being contacted by a foreign object coming from below, thus preventing damages and adhesion of dirt to the auxiliary machine, caused by contact of a foreign object.

9.

Figure 9:
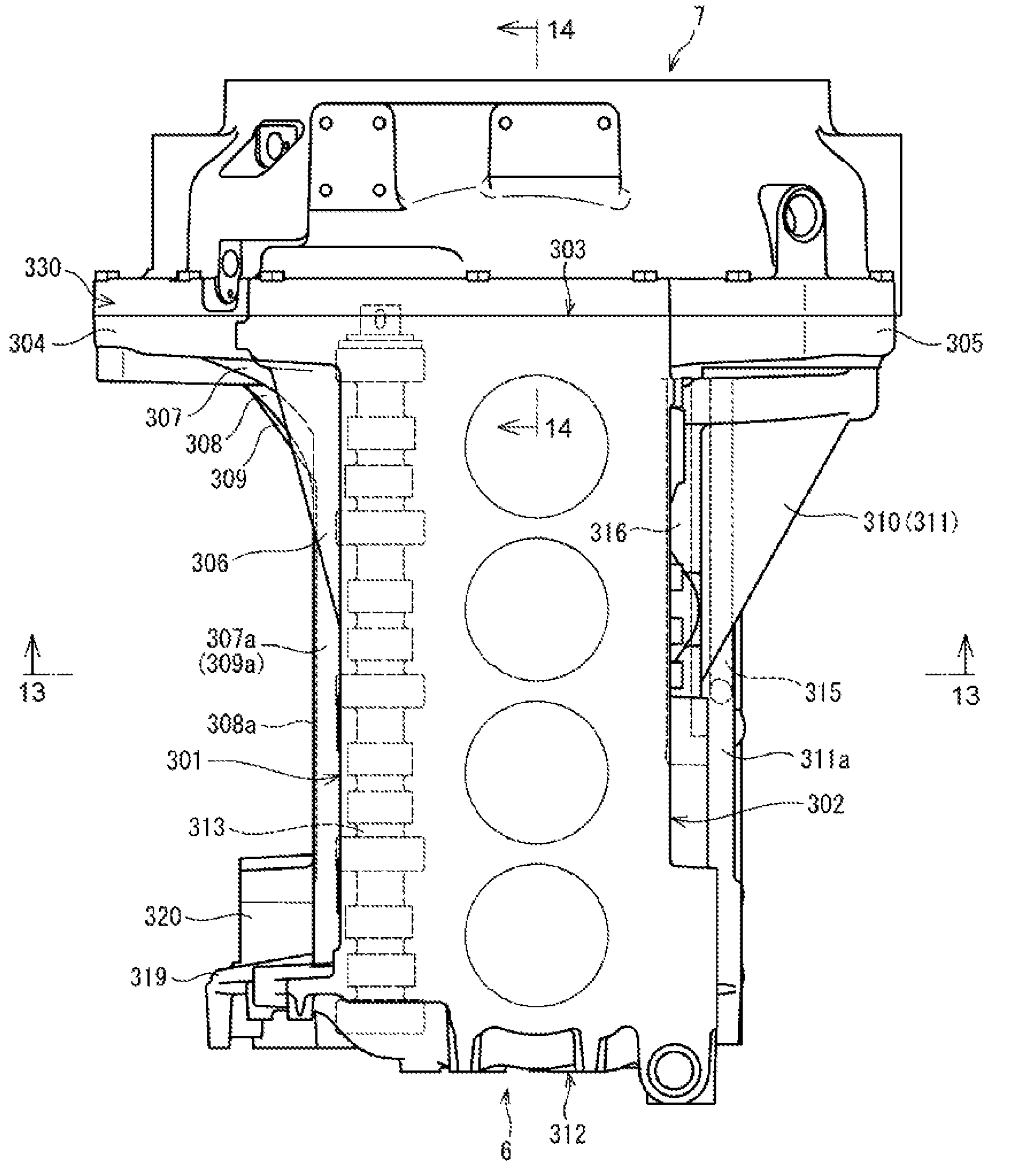
FIG. 9 A top plan view showing a cylinder block and a flywheel housing.
Figure 10:
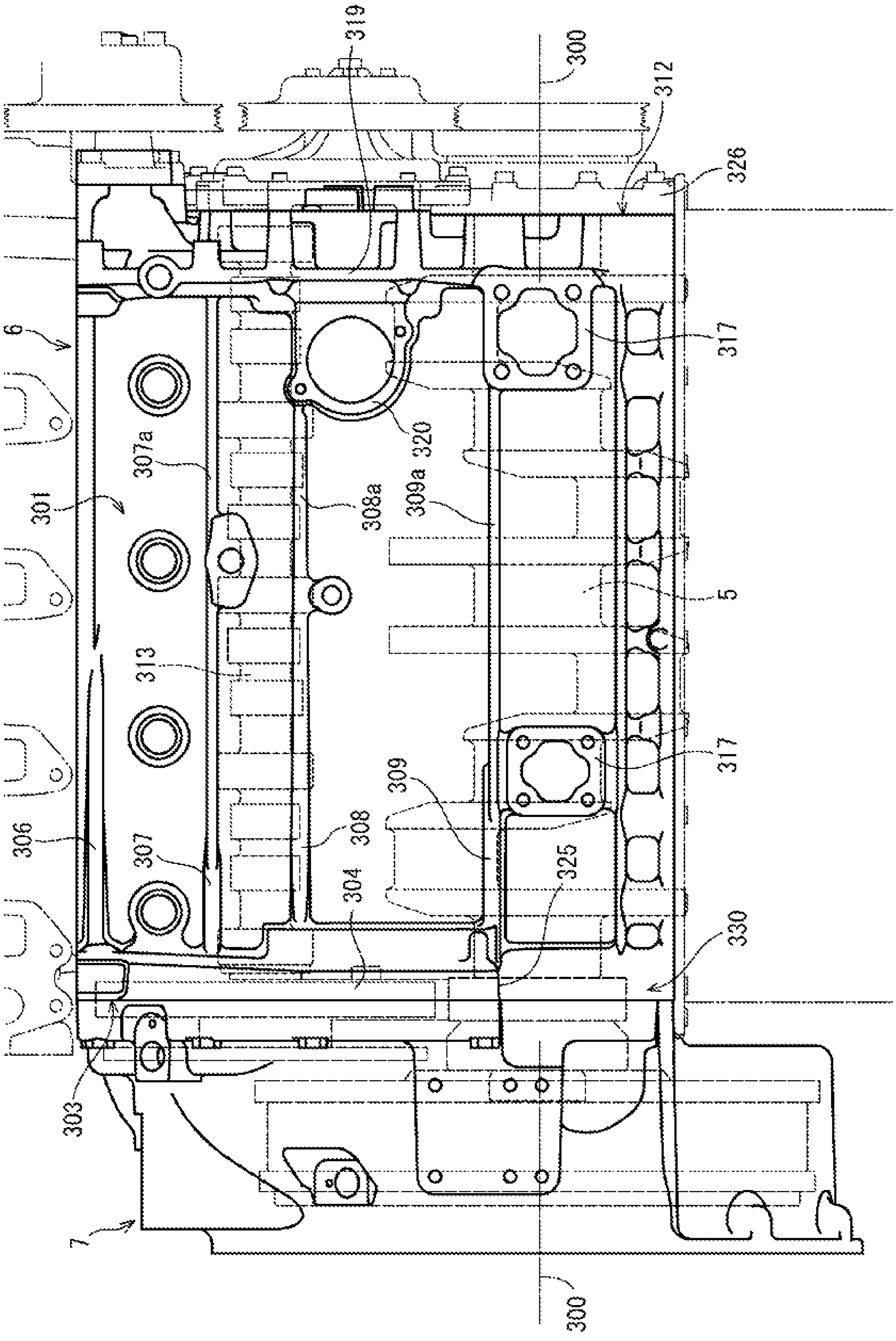
FIG. 10 A left side view showing the cylinder block and the flywheel housing.
Figure 14:
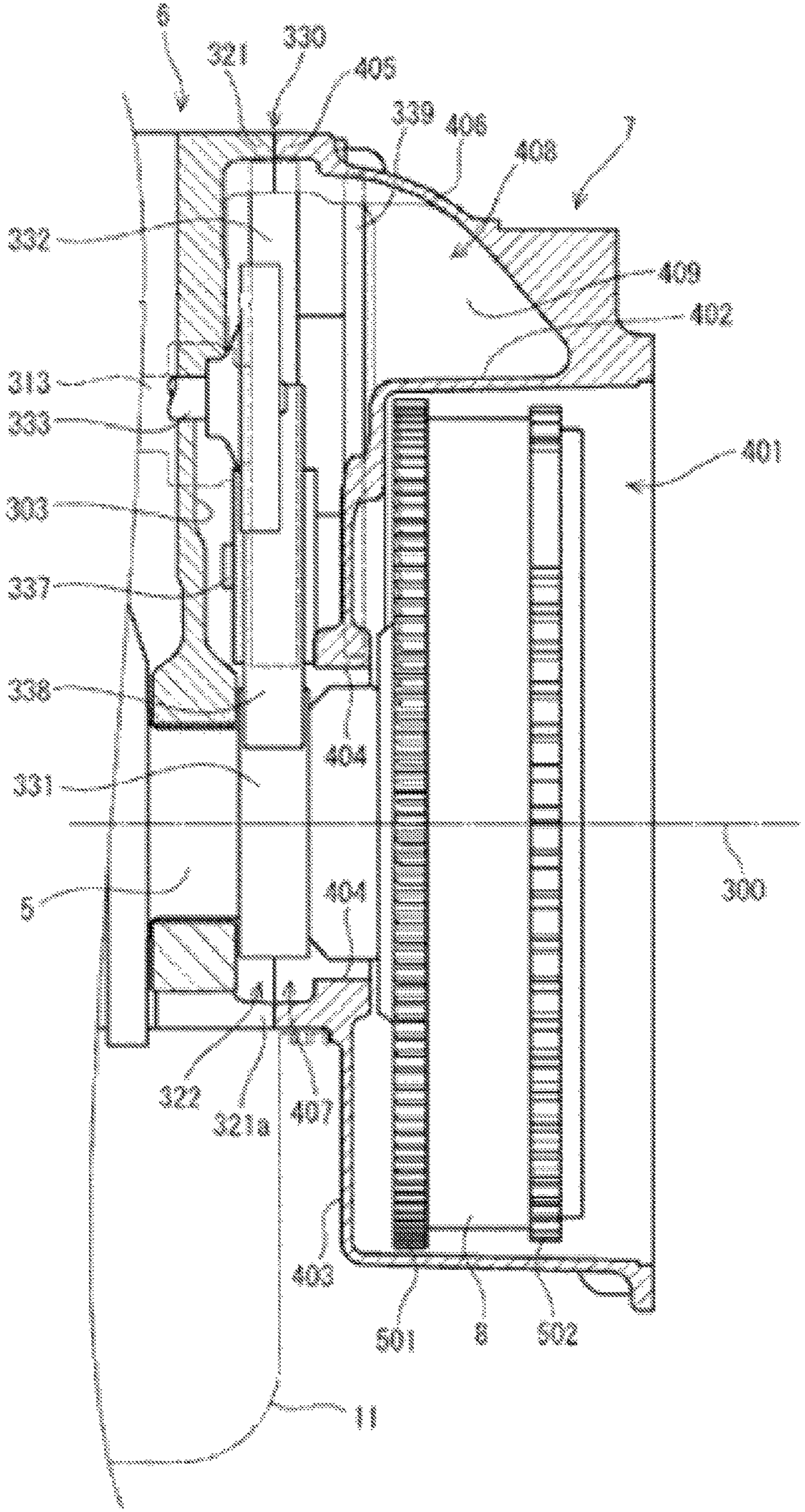

FIG. 14 A cross-sectional view taken along the line 14-14 in FIG. 9.

Figure 15:
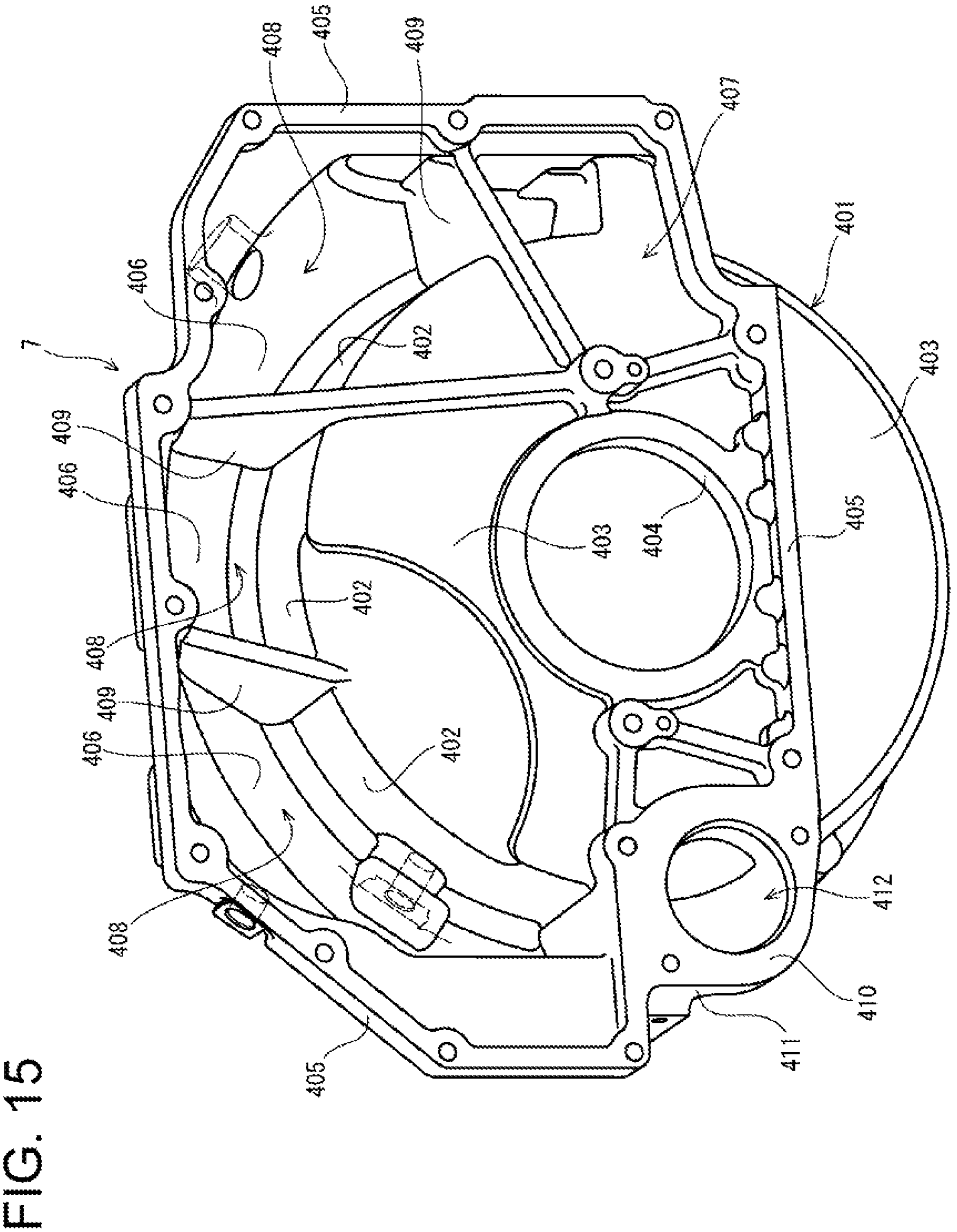

FIG. 15 A perspective view showing inside of the flywheel housing.

Figure 16:
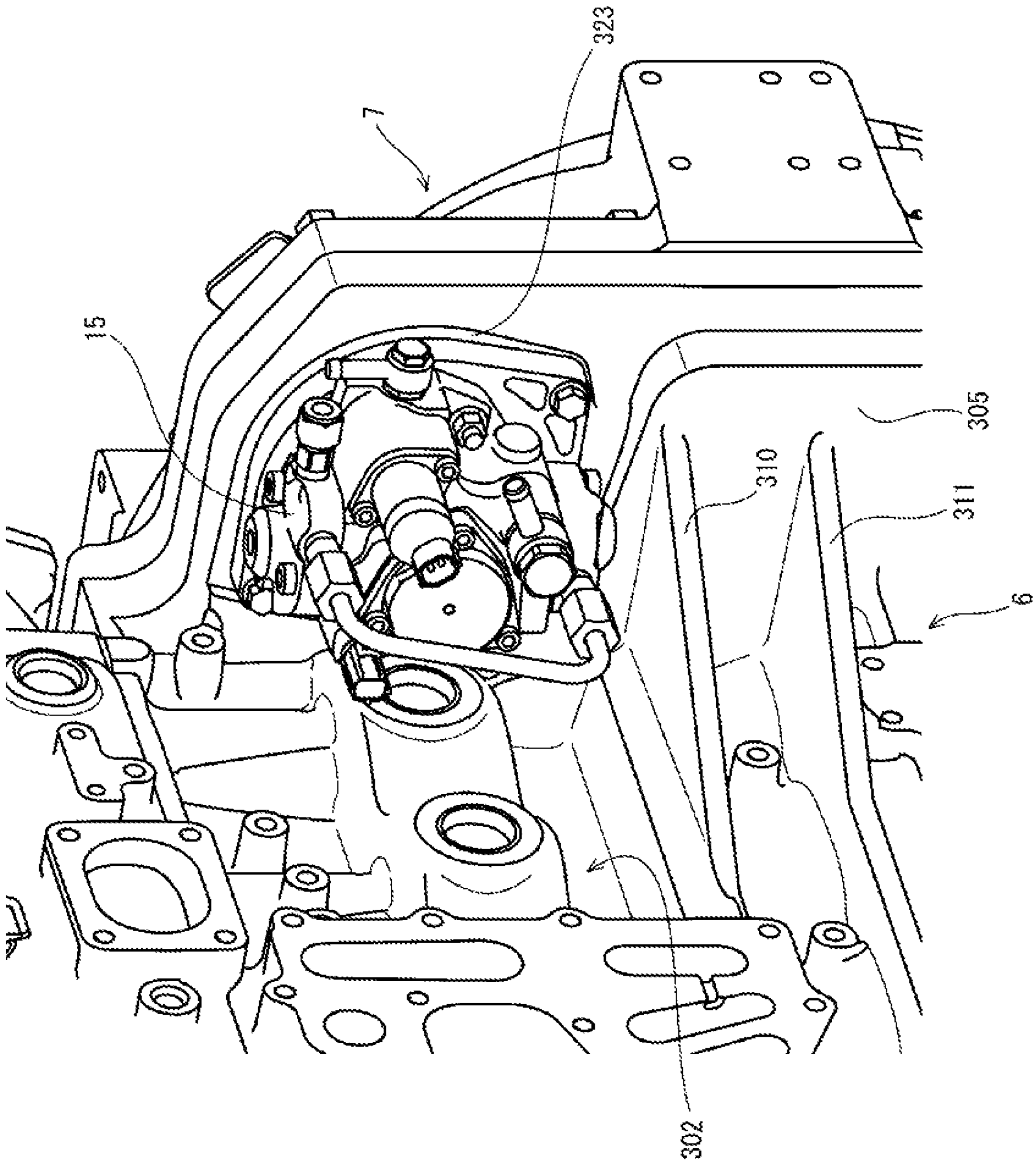

FIG. 16 A perspective view showing a position where a fuel feed pump is attached.

Figure 17:
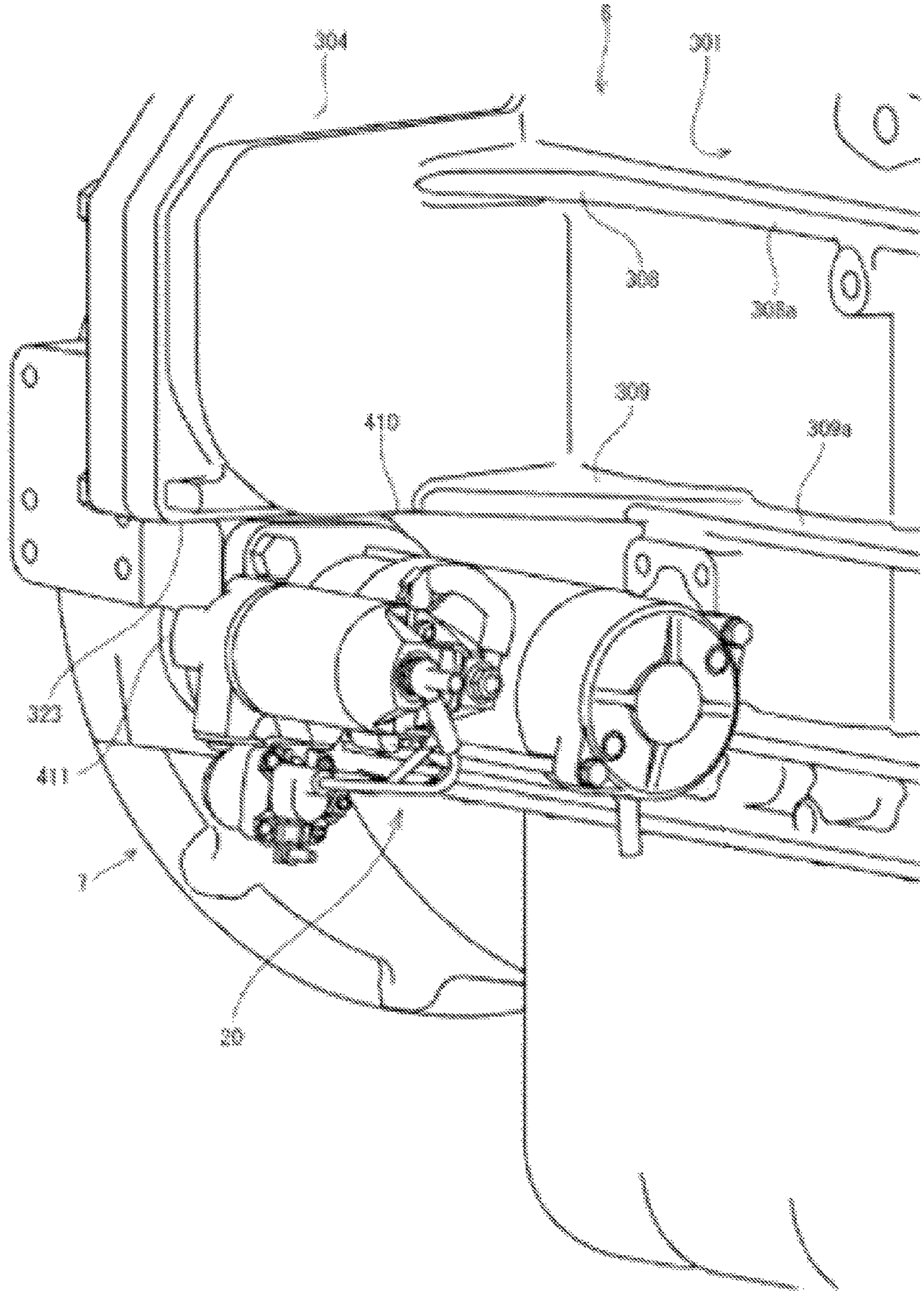

FIG. 17 A perspective view showing the position where the starter is attached.

Figure 18:
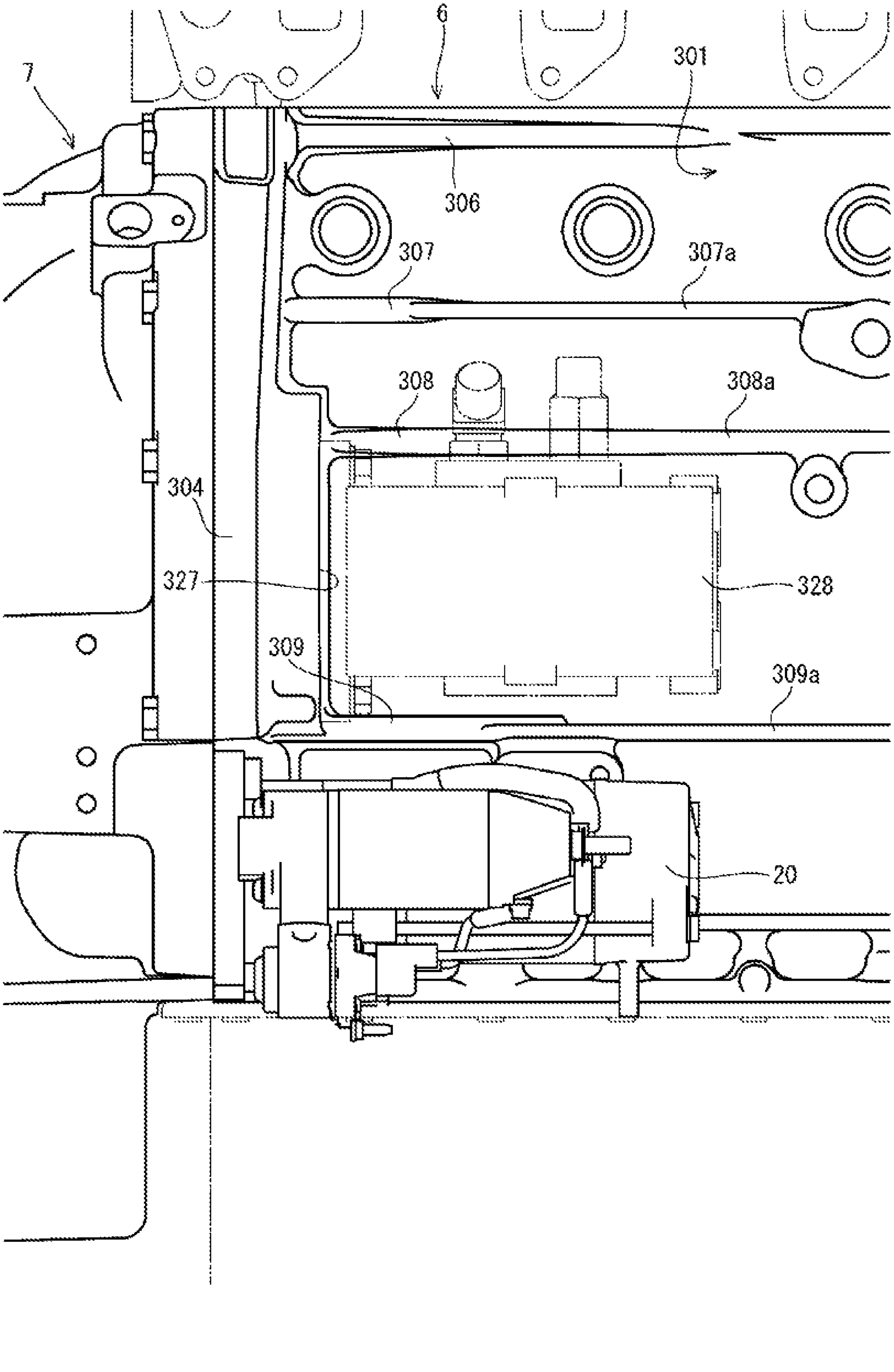

FIG. 18 A left side view showing a position where an external auxiliary machine is attached.

FIG. 19A perspective view showing the position where the external auxiliary machine is attached.

DESCRIPTION OF EMBODIMENTS

In the following, an embodiment of the present invention will be described with reference to the drawings. First, referring to FIG. 1 to FIG. 8, an overall structure of a diesel engine (engine device) 1 will be described. In the descriptions below, opposite side portions parallel to a crankshaft 5 (side portions on opposite sides relative to the crankshaft 5) will be defined as left and right, a side where a flywheel housing 7 is disposed will be defined as front, and a side where a cooling fan 9 is disposed will be defined as rear. For convenience, these are used as a benchmark for a positional relationship of left, right, front, rear, up, and down in the diesel engine 1.

As shown in FIG. 1 to FIG. 8, an intake manifold 3 and an exhaust manifold 4 are disposed in one side portion and the other side portion of the diesel engine 1 parallel to the crankshaft 5. In the embodiment, the intake manifold 3 provided on a right surface of a cylinder head 2 is formed integrally with the cylinder head 2. The exhaust manifold 4 is provided on a left surface of the cylinder head 2. The cylinder head 2 is mounted on a cylinder block 6 in which the crankshaft 5 and a piston (not shown) are disposed. The cylinder block 6 pivotally supports the crankshaft 5 such that the crankshaft 5 is rotatable.

The crankshaft 5 has its front and rear distal ends protruding from front and rear surfaces of the cylinder block 6. The flywheel housing 7 is fixed to one side portion of the diesel engine 1 (in the embodiment, a front surface side of the cylinder block 6) intersecting the crankshaft 5. A flywheel 8 is disposed in the flywheel housing 7. The flywheel 8, which is pivotally supported on the front end side of the crankshaft 5, is configured to rotate integrally with the crankshaft 5. The flywheel 8 is configured such that power of the diesel engine 1 is extracted to an actuating part of a work machine (for example, a hydraulic shovel, a forklift, or the like) through the flywheel 8. The cooling fan 9 is disposed in the other side portion of the diesel engine 1 (in the embodiment, a rear surface side of the cylinder block 6) intersecting the crankshaft 5. A rotational force is transmitted from the rear end side of the crankshaft 5 to the cooling fan 9 through a V-belt 10.

An oil pan 11 is disposed on a lower surface of the cylinder block 6. A lubricant is stored in the oil pan 11. The lubricant in the oil pan 11 is suctioned by an oil pump 12 (see FIG. 11) disposed on the right surface side of the cylinder block 6, the oil pump 12 being arranged in a coupling portion where the cylinder block 6 is coupled to the flywheel housing 7. The lubricant is then supplied to lubrication parts of the diesel engine 1 through an oil cooler 13 and an oil filter 14 that are disposed on the right surface of the cylinder block 6. The lubricant supplied to the lubrication parts is then returned to the oil pan 11. The oil pump 12 is configured to be driven by rotation of the crankshaft 5.

In the coupling portion where the cylinder block 6 is coupled to the flywheel housing 7, a fuel feed pump 15 for feeding a fuel is attached. The fuel feed pump 15 is disposed below an EGR device 24. A common rail 16 is fixed to a side surface of the cylinder block 6 at a location below the intake manifold 3 of the cylinder head 2. The common rail 16 is disposed above the fuel feed pump 15. Injectors (not shown) for four cylinders are provided on an upper surface of the cylinder head 2 which is covered with a head cover 18. Each of the injectors has a fuel injection valve of electromagnetic-controlled type.

Each of the injectors is connected to a fuel tank (not shown) through the fuel feed pump 15 and the common rail 16 having a cylindrical shape. The fuel tank is mounted in a work vehicle. A fuel in the fuel tank is pressure-fed from the fuel feed pump 15 to the common rail 16, so that a high-pressure fuel is stored in the common rail 16. By controlling the opening/closing of the fuel injection valves of the injectors, the high-pressure fuel in the common rail 16 is injected from the injectors to the respective cylinders of the diesel engine 1.

A blow-by gas recirculation device 19 is provided on an upper surface of the head cover 18 covering intake and exhaust valves (not shown), etc. disposed on the upper surface of the cylinder head 2. The blow-by gas recirculation device 19 takes in a blow-by gas that has leaked out of a combustion chamber of the diesel engine 1 or the like toward the upper surface of the cylinder head 2. A blow-by gas outlet of the blow-by gas recirculation device 19 is in communication with an intake part of a two-stage turbocharger 30 through a recirculation hose 68. A blow-by gas, from which a lubricant component is removed in the blow-by gas recirculation device 19, is then recirculated to the intake manifold 3 via the two-stage turbocharger 30.

An engine starting starter 20 is attached to the flywheel housing 7. The starter 20 is disposed below the exhaust manifold 4. A position where the starter 20 is attached to the flywheel housing 7 is below a coupling portion where the cylinder block 6 is coupled to the flywheel housing 7.

A coolant pump 21 for circulating a coolant is provided in a portion of the rear surface of the cylinder block 6, the portion being a little left-hand. Rotation of the crankshaft 5 causes the coolant pump 21 as well as the cooling fan 9 to be driven through the cooling fan driving V-belt 10. Driving the coolant pump 21 causes a coolant in a radiator (not shown) mounted in the work vehicle to be supplied to the coolant pump 21. The coolant is then supplied to the cylinder head 2 and the cylinder block 6, to cool the diesel engine 1.

A coolant inlet pipe 22 disposed below the exhaust manifold 4 is provided on the left surface of the cylinder block 6 and is fixed at a height equal to the height of the coolant pump 21. The coolant inlet pipe 22 is in communication with a coolant outlet of the radiator. A coolant outlet pipe 23 that is in communication with a coolant inlet of the radiator is fixed to a rear portion of the cylinder head 2. The cylinder head 2 has a coolant drainage 35 that protrudes rearward from the intake manifold 3. The coolant outlet pipe 23 is provided on an upper surface of the coolant drainage 35.

The inlet side of the intake manifold 3 is coupled to an air cleaner (not shown) via a collector 25 of an EGR device 24 (exhaust-gas recirculation device) which will be described later. Fresh air (outside air) suctioned by the air cleaner is subjected to dust removal and purification in the air cleaner, then fed to the intake manifold 3 through the collector 25, and then supplied to the respective cylinders of the diesel engine 1. In the embodiment, the collector 25 of the EGR device 24 is coupled to the right side of the intake manifold 3 which is formed integrally with the cylinder head 2 to form the right surface of the cylinder head 2. That is, an outlet opening of the collector 25 of the EGR device 24 is coupled to an inlet opening of the intake manifold 3 provided on the right surface of the cylinder head 2. In this embodiment, the collector 25 of the EGR device 24 is coupled to the air cleaner via an intercooler (not shown) and the two-stage turbocharger 30, as will be described later.

The EGR device 24 includes: the collector 25 serving as a relay pipe passage that mixes a recirculation exhaust gas of the diesel engine 1 (an EGR gas from the exhaust manifold 4) with fresh air (outside air from the air cleaner), and supplies a mixed gas to the intake manifold 3; an intake throttle member 26 that communicates the collector 25 with the air cleaner; a recirculation exhaust gas tube 28 that constitutes a part of a recirculation flow pipe passage connected to the exhaust manifold 4 via an EGR cooler 27; and an EGR valve member 29 that communicates the collector 25 with the recirculation exhaust gas tube 28.

The EGR device 24 is disposed on the right lateral side of the intake manifold 3 in the cylinder head 2. The EGR device 24 is fixed to the right surface of the cylinder head 2, and is in communication with the intake manifold 3 in the cylinder head 2. In the EGR device 24, the collector 25 is coupled to the intake manifold 3 on the right surface of the cylinder head 2, and an EGR gas inlet of the recirculation exhaust gas tube 28 is coupled and fixed to a front portion of the intake manifold 3 on the right surface of the cylinder head 2. The EGR valve member 29 and the intake throttle member 26 are coupled to the front and rear of the collector 25, respectively. An EGR gas outlet of the recirculation exhaust gas tube 28 is coupled to the rear end of the EGR valve member 29.

The EGR cooler 27 is fixed to the front surface of the cylinder head 2. The coolant and the EGR gas flowing in the cylinder head 2 flows into and out of the EGR cooler 27. In the EGR cooler 27, the EGR gas is cooled. EGR cooler coupling bases 33, 34 for coupling the EGR cooler 27 to the front surface of the cylinder head 2 protrude from left and right portions of the front surface of the cylinder head 2. The EGR cooler 27 is coupled to the coupling bases 33, 34. That is, the EGR cooler 27 is disposed on the front side of the cylinder head 2 and at a position above the flywheel housing 7 such that a rear end surface of the EGR cooler 27 and the front surface of the cylinder head 2 are spaced from each other.

The two-stage turbocharger 30 is disposed on a lateral side (in the embodiment, the left lateral side) of the exhaust manifold 4. The two-stage turbocharger 30 includes a high-pressure turbocharger 51 and a low-pressure turbocharger 52. The high-pressure turbocharger 51 includes a high-pressure turbine 53 in which a turbine wheel (not shown) is provided and a high-pressure compressor 54 in which a blower wheel (not shown) is provided. The low-pressure turbocharger 52 includes a low-pressure turbine 55 in which a turbine wheel (not shown) is provided and a low-pressure compressor 56 in which a blower wheel (not shown) is provided.

An exhaust gas inlet 57 of the high-pressure turbine 53 is coupled to the exhaust manifold 4. An exhaust gas inlet 60 of the low-pressure turbine 55 is coupled to an exhaust gas outlet 58 of the high-pressure turbine 53 via a high-pressure exhaust gas tube 59. An exhaust gas introduction side end portion of an exhaust gas discharge pipe (not shown) is coupled to an exhaust gas outlet 61 of the low-pressure turbine 55. A fresh air supply side (fresh air outlet side) of the air cleaner (not shown) is connected to a fresh air inlet port (fresh air inlet) 63 of the low-pressure compressor 56 via an air supply pipe 62. A fresh air inlet port 66 of the high-pressure compressor 54 is coupled to a fresh air supply port (fresh air outlet) 64 of the low-pressure compressor 56 via a low-pressure fresh air passage pipe 65. A fresh air introduction side of the intercooler (not shown) is connected to a fresh air supply port 67 of the high-pressure compressor 54 via a high-pressure fresh air passage pipe (not shown).

The high-pressure turbocharger 51 is coupled to the exhaust gas outlet 58 of the exhaust manifold 4, and is fixed to the left lateral side of the exhaust manifold 4. On the other hand, the low-pressure turbocharger 52 is coupled to the high-pressure turbocharger 51 via the high-pressure exhaust gas tube 59 and the low-pressure fresh air passage pipe 65, and is fixed above the exhaust manifold 4. Thus, the exhaust manifold 4 and the high-pressure turbocharger 51 with a small diameter are disposed side-by-side with respect to the left-right direction below the low-pressure turbocharger 52 with a large diameter. As a result, the two-stage turbocharger 30 is arranged so as to surround the left surface and the upper surface of the exhaust manifold 4. That is, the exhaust manifold 4 and the two-stage turbocharger 30 are arranged so as to form a rectangular shape in a rear view (or front view), and are compactly fixed to the left surface of the cylinder head 2.

Next, referring to FIG. 9 to FIG. 13, a configuration of the cylinder block 6 will be described. The cylinder block 6 is provided with a left housing bracket portion 304 and a right housing bracket portion 305 (protruding portions) that are disposed in end portions of a left surface 301 and a right surface 302 of the cylinder block 6, the end portions being on the front surface 303 side and extending in a direction along a crankshaft center 300. The flywheel housing 7 is fixed to the left housing bracket portion 304 and the right housing bracket portion 305 with a plurality of bolts. A left-side first reinforcing rib 306, a left-side second reinforcing rib 307, a left-side third reinforcing rib 308, and a left-side fourth reinforcing rib 309, which are arranged in this order from up to down (from the top deck side to the oil pan rail side), are provided between the left housing bracket portion 304 and a side wall of the left surface 301. A right-side first reinforcing rib 310 and a right-side second reinforcing rib 311, which are arranged in this order from up to down, are disposed between the right housing bracket portion 305 and the side wall of the right surface 302. The housing bracket portions 304, 305 and the reinforcing ribs 306 to 311 are formed integrally with the cylinder block 6.

Each of the reinforcing ribs 306 to 311 extends in the direction along the crankshaft center 300. In a plan view, each of the housing bracket portions 304, 305 has a substantially wide triangular shape. The left-side reinforcing ribs 307, 308, 309 and the right-side second reinforcing rib 311 have linear portions 307*a,* 308*a,* 309*a,* 311*a* that extend from the substantially triangular portions toward a rear surface 312 of the cylinder block 6 (see FIG. 7 and FIG. 8, too). The reinforcing ribs 306, 307, 308 are disposed in a cylinder portion of the cylinder block 6. The reinforcing ribs 309, 310, 311 are disposed in a skirt portion of the cylinder block 6.

Figure 1:
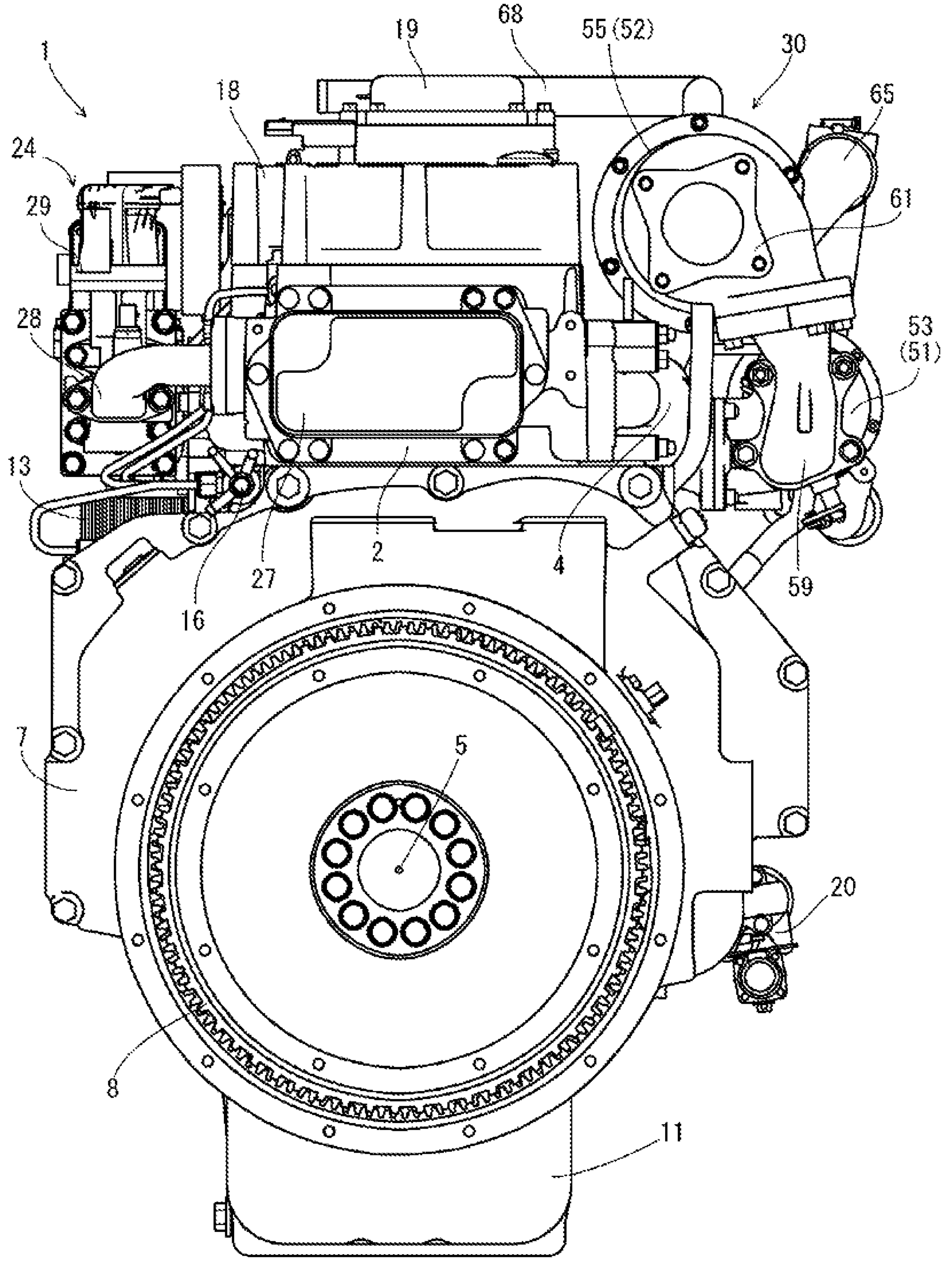
FIG. 1 A front view of an engine.
Figure 2:
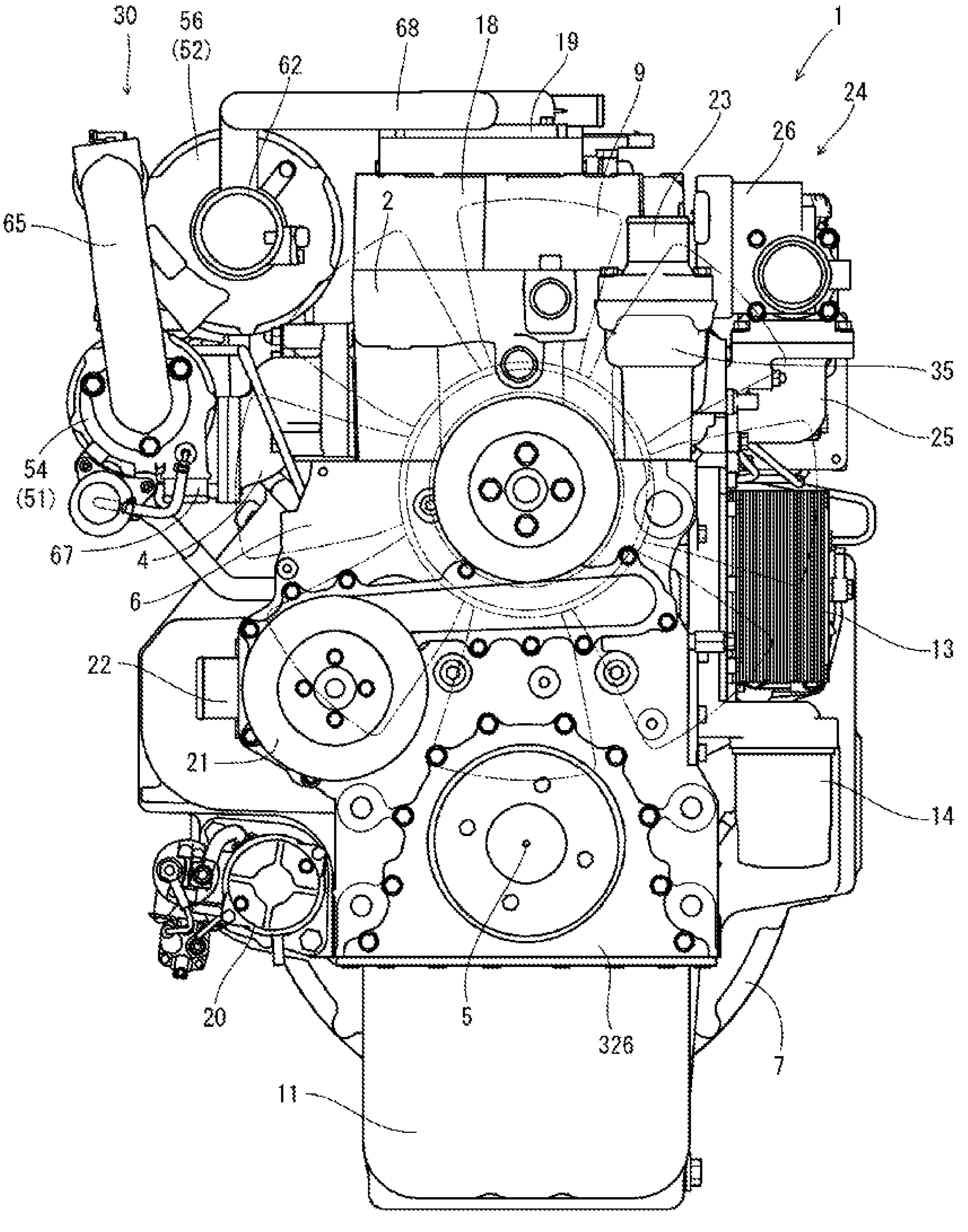
FIG. 2 A rear view of the engine.
Figure 3:
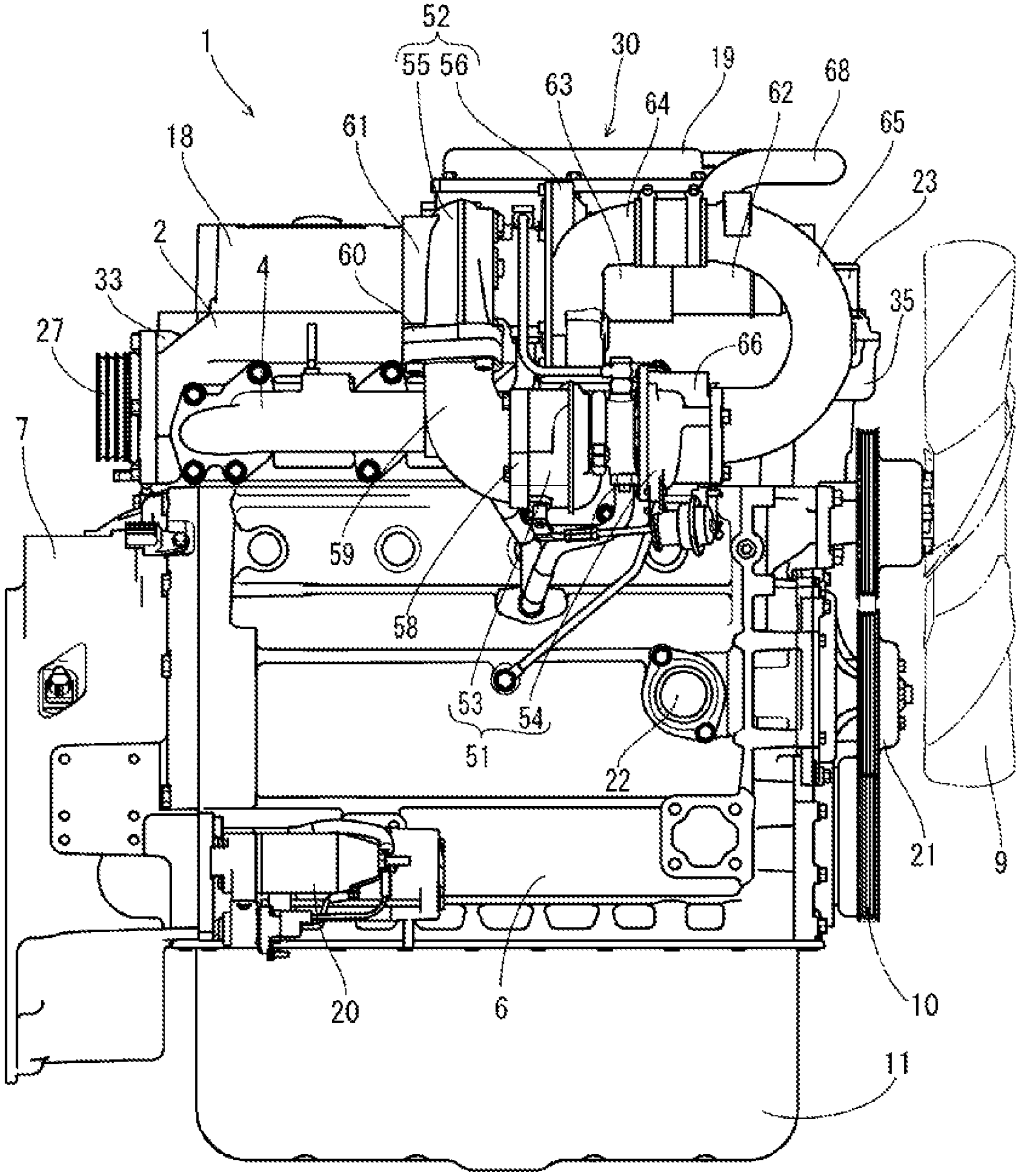
FIG. 3 A left side view of the engine.
Figure 4:
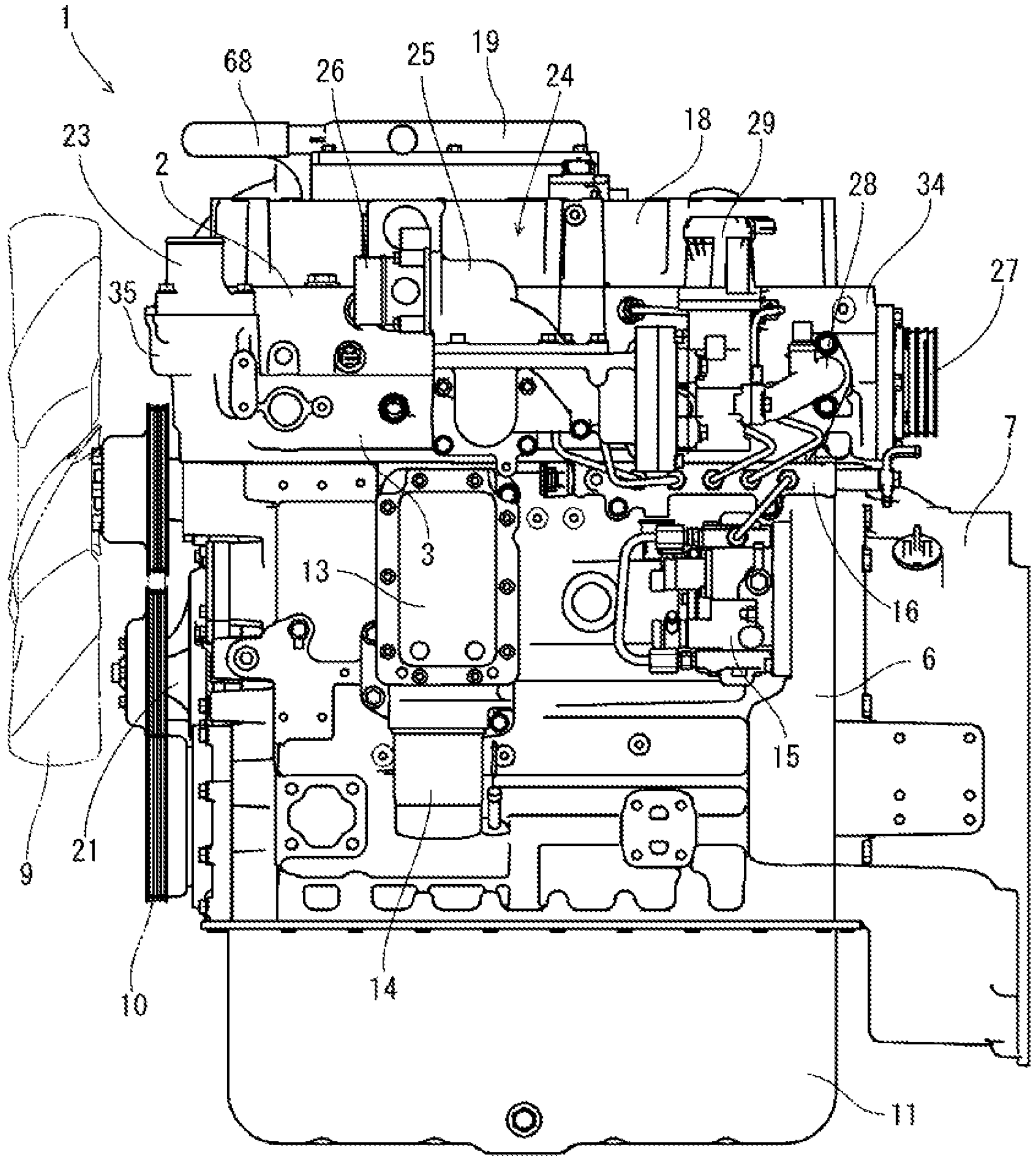
FIG. 4 A right side view of the engine.
Figure 5:
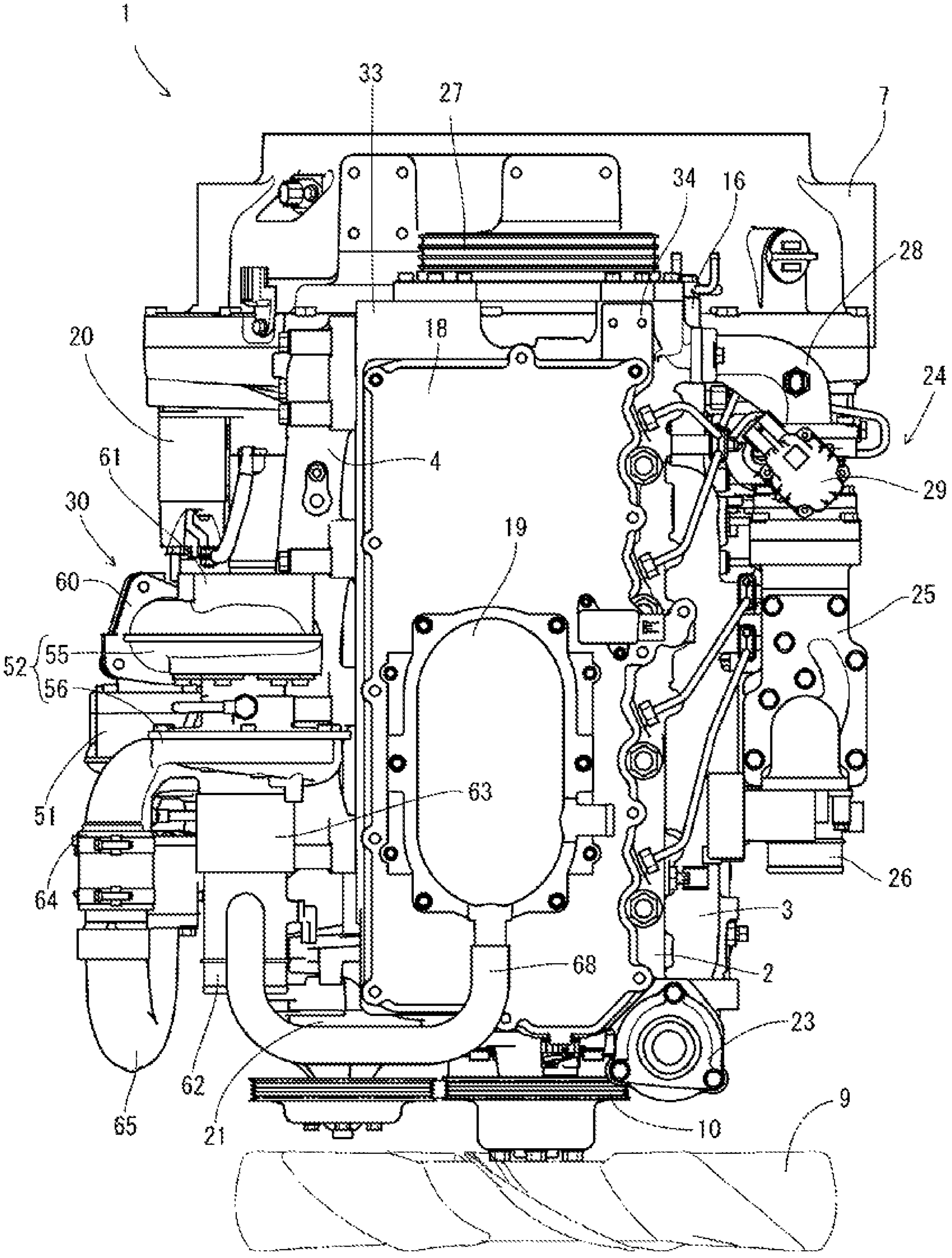
FIG. 5 A top plan view of the engine.
Figure 6:
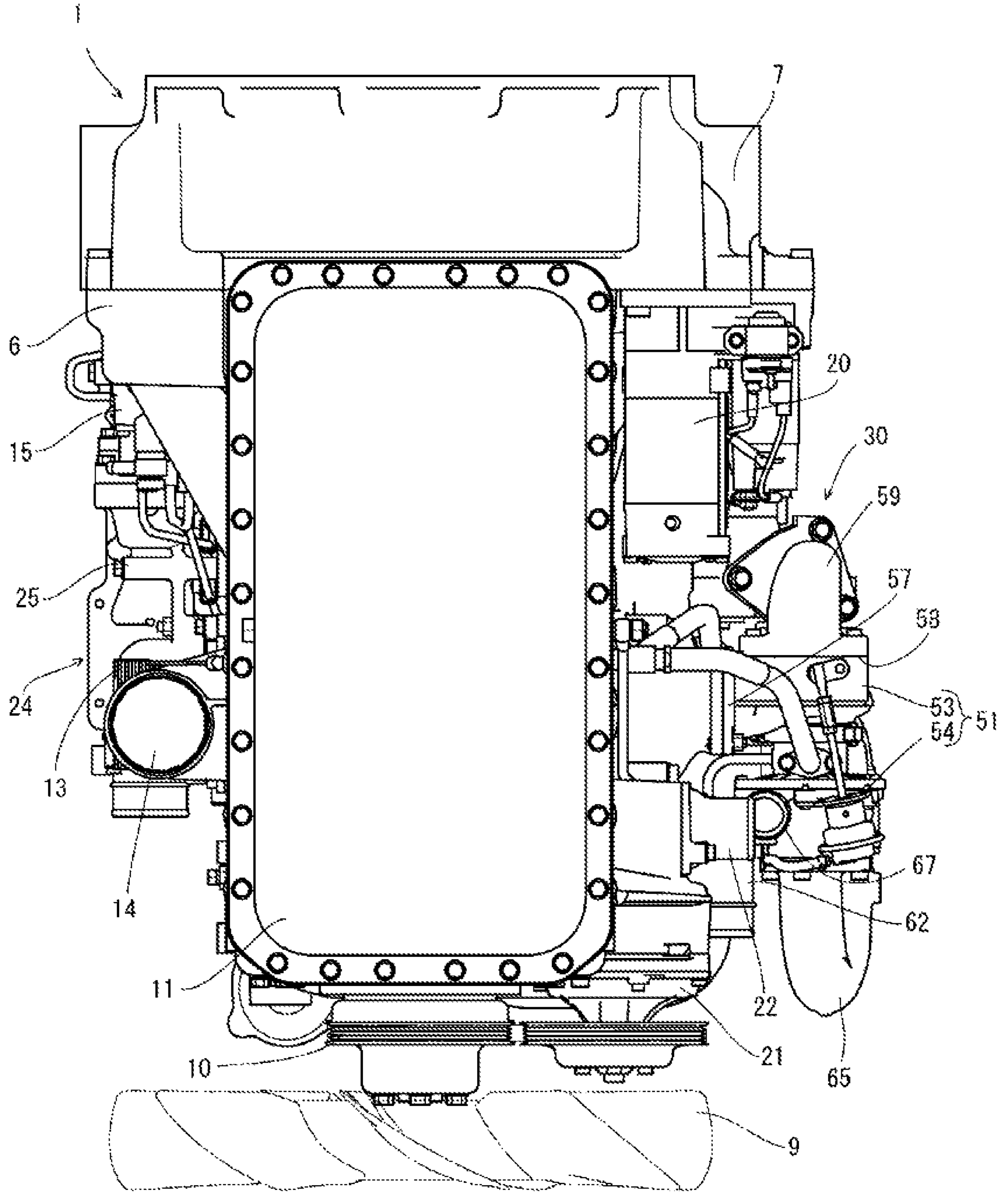
FIG. 6 A bottom plan view of the engine.
Figure 7:
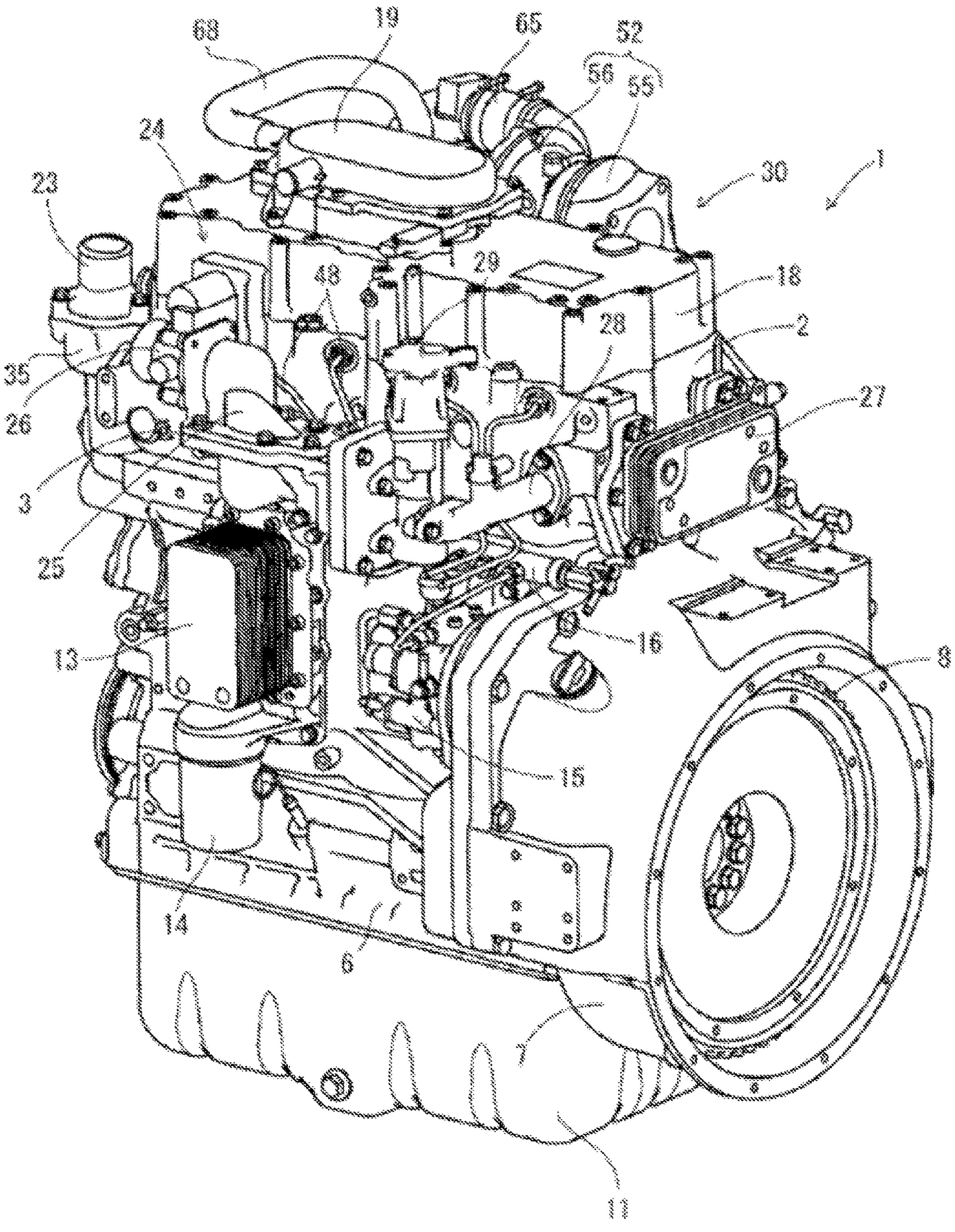
FIG. 7 A perspective view of the engine as viewed from diagonally front.
Figure 8:
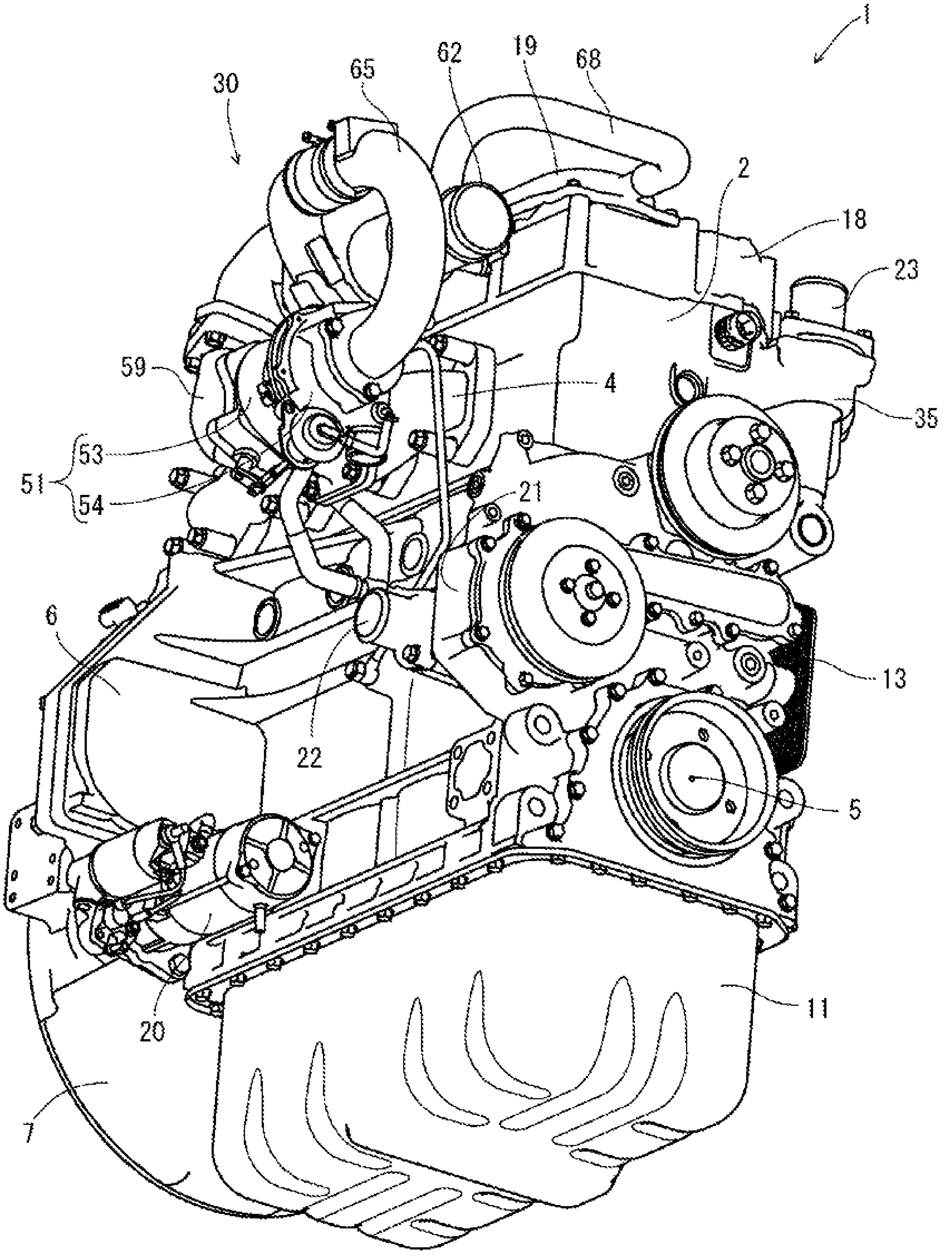
FIG. 8 A perspective view of the engine as viewed from diagonally rear.

Each of the left surface 301 and the right surface 302 is provided with two mount attachment pedestals 317 for attachment of an engine mount which couples the engine 1 to a vehicle body. The two mount attachment pedestals 317 are arranged one behind the other with respect to the front-rear direction, and protrude at positions close to the oil pan rail. The left-side fourth reinforcing rib 309 is coupled to the two mount attachment pedestals 317 protruding from the left surface 301. The right-side second reinforcing rib 311 is coupled to the two mount attachment pedestals 317 protruding from the right surface 302. As shown in FIG. 2, a crank case covering member 326 is secured to the rear surface 312 of the cylinder block 6 with bolts. The crank case covering member 326 covers surroundings of the crankshaft 5 so as not to expose the inside of a crank case to the outside of the engine 1. The oil pan 11 is fastened to a lower surface of the crank case covering member 326 with at least one bolt.

The housing bracket portions 304, 305 and the reinforcing ribs 306 to 311 which are formed integrally with the cylinder block 6 contribute to enhancement of the rigidity of the cylinder block 6, and particularly the rigidity and strength of a portion of the cylinder block 6 near the front surface 303. Thus, vibration and noise of the engine 1 can be reduced. In addition, since the housing bracket portions 304, 305 and the reinforcing ribs 306 to 311 contribute to an increase in a surface area of the cylinder block 6, the cooling efficiency of the cylinder block 6 can be enhanced, and therefore the cooling efficiency of the engine 1 can be enhanced.

A coolant pump attaching part 319 and an inlet pipe attachment pedestal 320 are provided so as to protrude from a portion of the left surface 301 of the cylinder block 6, the portion being relatively close to the rear surface 312. To the coolant pump attaching part 319, a coolant pump 21 (see FIG. 2, etc.) is attached. To the inlet pipe attachment pedestal 320, the coolant inlet pipe 22 (see FIG. 3, etc.) is attached. A portion of the inlet pipe attachment pedestal 320 close to the rear surface 312 is coupled to the coolant pump attaching part 319. The coolant pump attaching part 319 and the inlet pipe attachment pedestal 320 protrude in a direction away from the crankshaft 5, and contributes to enhancing of the rigidity, the strength, and the cooling efficiency of the cylinder block 6.

A camshaft casing 314 (see FIG. 13) for accommodating a camshaft 313 is provided inside the cylinder block 6. Although details are omitted, a crank gear 331 fixed to the crankshaft 5 and a cam gear 332 fixed to the camshaft 313 are disposed on the front surface 303 of the cylinder block 6. The cam gear 332 and the camshaft 313 are rotated in conjunction with the crank gear 331. Driving a valve mechanism (not shown) that is associated with the camshaft 313 causes an intake valve and an exhaust valve (not shown) of the engine 1 to be opened or closed. The engine 1 of this embodiment has a so-called overhead valve system.

The camshaft casing 314 is disposed in the cylinder portion of the cylinder block 6, and is arranged at a position relatively close to the left surface 301. The camshaft 313 and the camshaft casing 314 are disposed in the direction along the crankshaft center 300. Substantially triangular portions and the linear portions 307*a*, 308*a* of the left-side second reinforcing rib 307 and the left-side third reinforcing rib 308 provided on the left surface 301 of the cylinder block 6 are arranged close to a position where the camshaft casing 314 is disposed in a side view, and more specifically at a position overlapping the position where the camshaft casing 314 is disposed.

This embodiment, in which the rigidity of the camshaft casing 314 and therearound is enhanced by the left-side second reinforcing rib 307 and the left-side third reinforcing rib 308, can prevent distortion of the camshaft casing 314. Accordingly, a variation in the rotation resistance and the rotational friction of the camshaft 313, which may occur due to distortion of the camshaft casing 314, can be prevented, so that the camshaft 313 can be rotated appropriately to open or close the intake valve and the exhaust valve (not shown) appropriately.

Of a lubricant passage provided in the cylinder block 6, a part is disposed in the skirt portion of the cylinder block 6 and arranged at a position relatively close to the right surface 302. The part includes a lubricant sucking passage 315 and a lubricant supply passage 316. The lubricant supply passage 316 is disposed in the skirt portion of the cylinder block 6 and arranged at a position relatively close to the cylinder portion. The lubricant sucking passage 315 is arranged at a position relatively close to the oil pan rail as compared to the lubricant supply passage 316.

One end of the lubricant sucking passage 315 is opened in an oil pan rail lower surface (a surface opposed to the oil pan 11) of the cylinder block 6, and is connected to a lubricant sucking pipe (not shown) disposed in the oil pan 11. The other end of the lubricant sucking passage 315 is opened in the front surface 303 of the cylinder block 6, and is connected to a suction port of the oil pump 12 (see FIG. 11) fixed to the front surface 303. One end of the lubricant supply passage 316 is opened in the front surface 303 of the cylinder block 6 at a position different from the position where the lubricant sucking passage 315 is opened, and is connected to an ejection port of the oil pump 12. The other end of the lubricant supply passage 316 is opened in an oil cooler attachment pedestal 318 protruding from the right surface 302 of the cylinder block 6, and is connected to a suction port of the oil cooler 13 (see FIG. 4, etc.) disposed on the oil cooler attachment pedestal 318. Not only the lubricant sucking passage 315 and the lubricant supply passage 316 but also other lubricant passages are provided in the cylinder block 6.

On the right surface 302 of the cylinder block 6, the right-side first reinforcing rib 310 is arranged close to the position where the lubricant supply passage 316 is arranged in a side view. More specifically, the right-side first reinforcing rib 310 is arranged so as to overlap the position where the lubricant supply passage 316 is arranged in a side view. The right-side second reinforcing rib 311 is arranged close to the position where the lubricant sucking passage 315 is arranged in a side view. The reinforcing ribs 310, 311 and the passages 315, 316 extend in the direction along the crankshaft center 300.

In this embodiment, the cooling efficiency in the vicinity of the lubricant sucking passage 315, the oil pump 12, and the lubricant supply passage 316 can be enhanced by the right housing bracket portion 305, the right-side first reinforcing rib 310, and the right-side second reinforcing rib 111. In particular, the right-side first reinforcing rib 310 arranged at a position overlapping the lubricant supply passage 316 in a side view efficiently dissipates heat in the vicinity of the lubricant supply passage 316 to the outside. This can lower the temperature of the lubricant flowing into the oil cooler 13, and can reduce the amount of heat exchange required of the oil cooler 13.

A gear train structure of the engine 1 will now be described with reference to FIG. 10 to FIG. 16. A gear case 330 is provided in a space surrounded by the front surface 303 of the cylinder block 6, the housing bracket portions 304, 305, and the flywheel housing 7. As shown in FIG. 12 and FIG. 14, front distal end portions of the crankshaft 5 and the camshaft 313 protrude from the front surface 303 of the cylinder block 6. The crank gear 331 is secured to the front distal end portion of the crankshaft 5. The cam gear 332 is secured to the front distal end portion of the camshaft 313. A disk-shaped camshaft pulsar 339 is fastened with bolts to a surface of the cam gear 332 on the flywheel housing 7 side such that the camshaft pulsar 339 is rotatable integrally with the cam gear 332.

Figure 12:
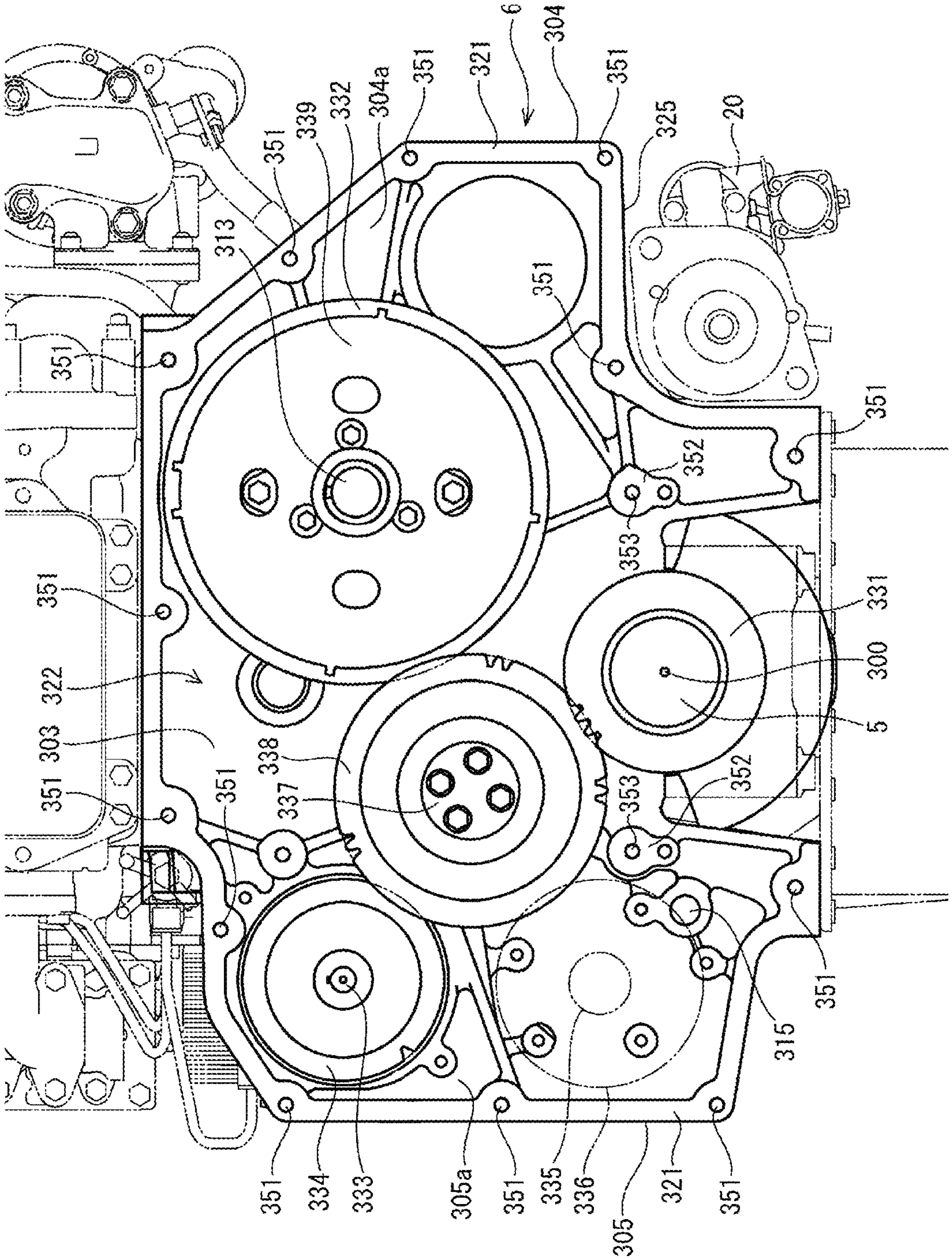
FIG. 12 A front view showing a gear train.
Figure 13:
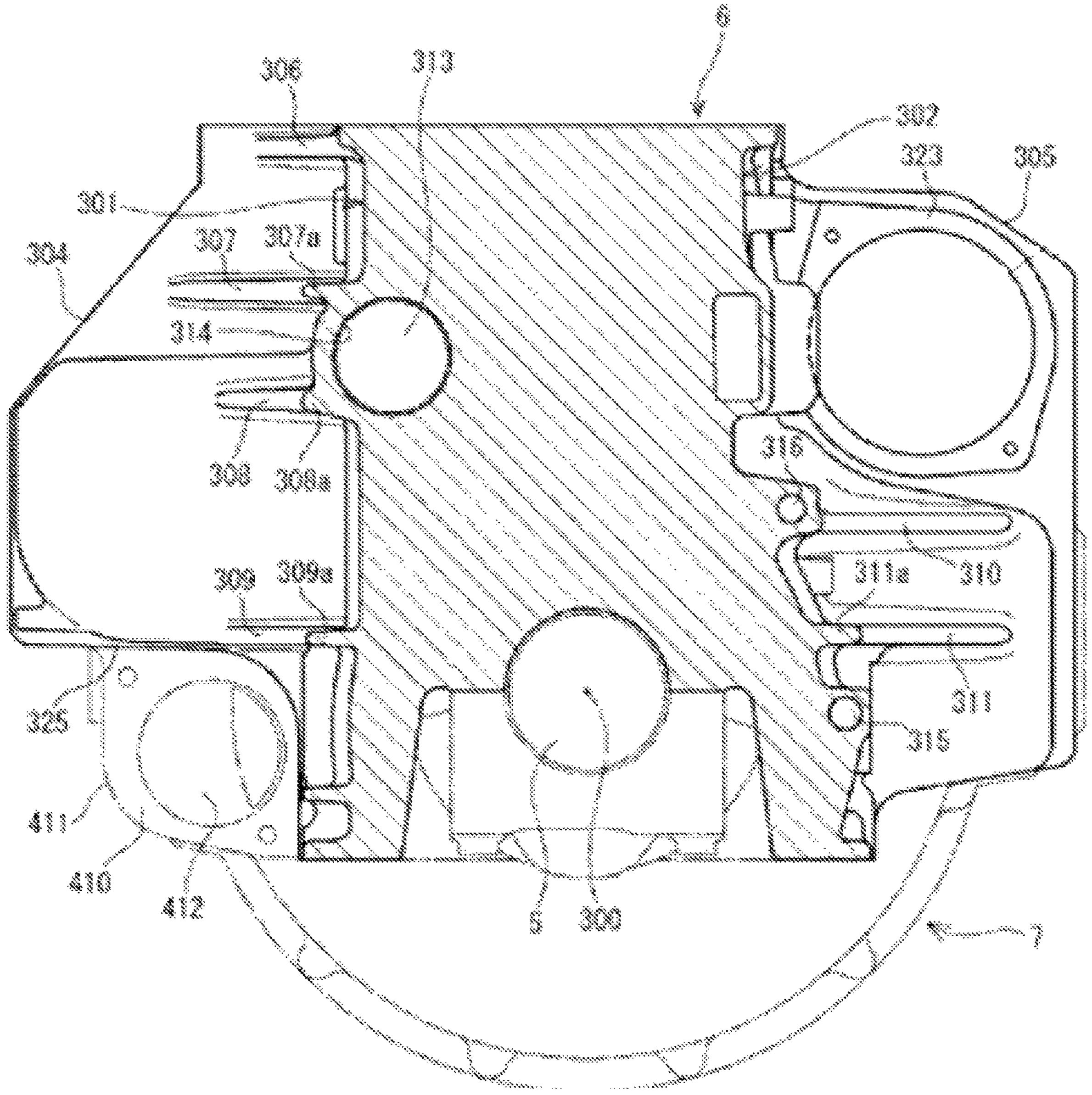
FIG. 13 A cross-sectional view taken along the line 13-13 in FIG.

As shown in FIG. 12, FIG. 13, and FIG. 16, the fuel feed pump 15 provided in the right housing bracket portion 305 of the cylinder block 6 includes a fuel feed pump shaft 333 as a rotation shaft extending in parallel to the rotation axis of the crankshaft 5. The front end side of the fuel feed pump shaft 333 protrudes from a front surface 305*a* of the right housing bracket portion 305. A fuel feed pump gear 334 is secured to a front distal end portion of the fuel feed pump shaft 333. As shown in FIG. 13, the right housing bracket portion 305 of the cylinder block 6 includes a fuel feed pump attachment pedestal 323 for arranging the fuel feed pump 15 above the right-side first reinforcing rib 310. A fuel feed pump gear 334 is secured to a front distal end portion of the fuel feed pump shaft 333.

Figure 11:
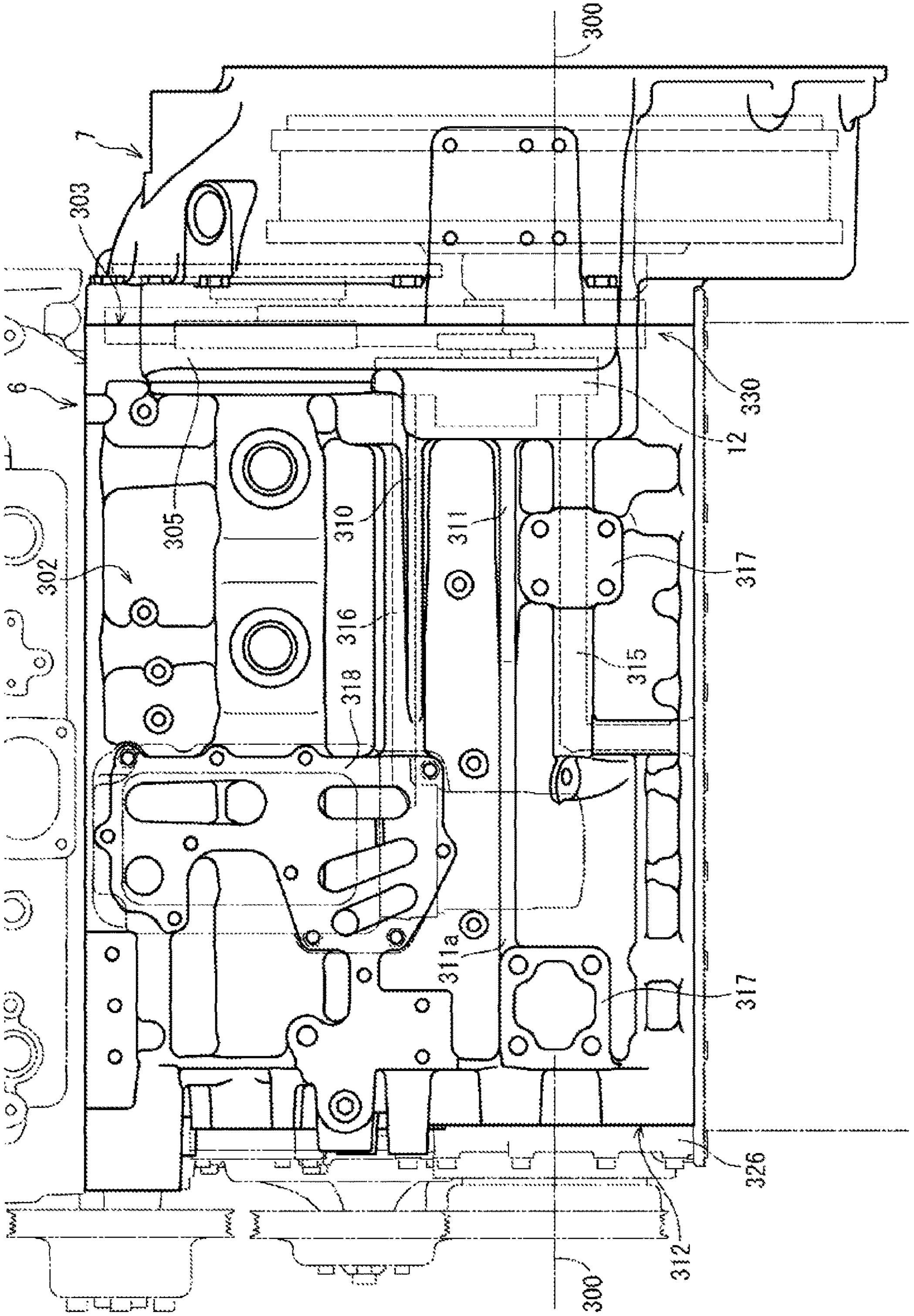
FIG. 11 A right side view showing the cylinder block and the flywheel housing.

As shown in FIG. 11 and FIG. 12, the oil pump 12, which is disposed on the front surface 305*a* of the right housing bracket portion 305 and arranged below the fuel feed pump gear 334, includes an oil pump shaft 335 as a rotation shaft extending in parallel to the rotation axis of the crankshaft 5. An oil pump gear 336 is secured to a front distal end portion of the oil pump shaft 335.

On the front surface 303 of the cylinder block 6, an idle shaft 337 extending in parallel to the rotation axis of the crankshaft 5 is provided in a portion surrounded by the crankshaft 5, the camshaft 313, the fuel feed pump shaft 333, and the oil pump shaft 335. The idle shaft 337 is fixed to the front surface 303 of the cylinder block 6. An idle gear 338 is rotatably supported on the idle shaft 337.

The idle gear 338 is meshed with four gears, namely, the crank gear 331, the cam gear 332, the fuel feed pump gear 334, and the oil pump gear 336. Rotational power of the crankshaft 5 is transmitted from the crank gear 331 to the three gears of the cam gear 332, the fuel feed pump gear 334, and the oil pump gear 336, via the idle gear 338. Thus, the camshaft 313, the fuel feed pump shaft 333, and the oil pump shaft 335 are rotated in conjunction with the crankshaft 5. In the embodiment, the gear ratio among the gears 331, 332, 334, 336, 338 is set such that: two rotations of the crankshaft 5 correspond to one rotation of the camshaft 313; and one rotation of the crankshaft 5 corresponds to one rotation of the fuel feed pump shaft 333 and the oil pump shaft 335.

In this configuration, rotating the cam gear 332 and the camshaft 313 in conjunction with the crank gear 331 which rotates together with the crankshaft 5 to drive the valve mechanism (not shown) that is associated with the camshaft 313 causes the intake valve and the exhaust valve (not shown) provided in the cylinder head 2 to be opened or closed. In addition, rotating the fuel feed pump gear 334 and the fuel feed pump shaft 333 in conjunction with the crank gear 331 to drive the fuel feed pump 15 causes the fuel in the fuel tank 118 to be pressure-fed to the common rail 120 so that a high-pressure fuel is stored in the common rail 120. In addition, rotating the oil pump gear 336 and the oil pump shaft 335 in conjunction with the crank gear 331 to drive the oil pump 12 causes the lubricant in the oil pan 11 to be supplied to various sliding component parts and the like through a lubricating system circuit (details are not shown) including the lubricant sucking passage 315, the lubricant supply passage 316, the oil cooler 13, the oil filter 14, and the like. A fuel in the fuel tank 118 is pressure-fed from the fuel feed pump 15 to the common rail 16, so that a high-pressure fuel is stored in the common rail 16.

As shown in FIG. 16, the fuel feed pump 15 serving as an auxiliary machine that is operated in conjunction with rotation of the crankshaft 5 is secured with bolts to the fuel feed pump attachment pedestal 323 of the right housing bracket portion 305. The right-side first reinforcing rib 310 is arranged close to the fuel feed pump attachment pedestal 323. The right-side first reinforcing rib 310 is arranged directly under the fuel feed pump 15, and the right-side second reinforcing rib 311 is arranged directly under the right-side first reinforcing rib 310. The reinforcing ribs 310, 311 can enhance the rigidity of the fuel feed pump attachment pedestal 323, and also can prevent the fuel feed pump 15 from being contacted by a foreign object such as muddy water or stone coming from below, for protection of the fuel feed pump 15.

The gear case 330 that accommodates the gear train will now be described with reference to FIG. 10 to FIG. 12, FIG. 14, and FIG. 15. A block-side projecting portion 321 that extends along a peripheral edge of a region including the front surfaces 303, 304*a*, 305*a* of the cylinder block 6 and of the left and right housing bracket portions 304, 305 is provided upright on a peripheral edge portion of the front surfaces 303, 304*a*, 305*a*. The block-side projecting portion 321 is joined with the flywheel housing 7. The block-side projecting portion 321 has a cutout portion 321*a* at a location between the left and right oil pan rails of the cylinder block 6. A space between an end surface of the block-side projecting portion 321 and the front surfaces 303, 304*a*, 305*a* in a side view defines a block-side gear casing 322.

As shown in FIG. 14 and FIG. 15, the flywheel housing 7 which is made of, for example, cast iron includes a flywheel accommodating part 401 that accommodates the flywheel 8. The flywheel accommodating part 401 has a bottomed cylindrical shape formed by a circumferential wall surface portion 402 and a rear wall surface portion 403 being coupled to each other. The circumferential wall surface portion 402 has a substantially cylindrical shape and covers the outer circumferential side of the flywheel 8. The rear wall surface portion 403 covers a rear surface side (a surface on the cylinder block 6 side) of the flywheel 8. The flywheel 8 is accommodated in a space surrounded by the circumferential wall surface portion 402 and the rear wall surface portion 403. The circumferential wall surface portion 402 is in the shape of a substantially truncated cone with its radius decreasing toward the rear wall surface portion 403. The rear wall surface portion 403 has, in its central portion, a crankshaft insertion hole 404 through which the crankshaft 5 is inserted.

A flange-side projecting portion 405 having an annular shape that corresponds to the shape of the block-side projecting portion 321 of the cylinder block 6 is coupled to the rear wall surface portion 403 so as to surround a position where the crankshaft insertion hole 404 is disposed. The center of the flange-side projecting portion 405 is deviated upward from the crankshaft insertion hole 404. A lower portion of the flange-side projecting portion 405, which extends in the left-right direction (lateral direction), is close to the crankshaft insertion hole 404 and is coupled to the rear wall surface portion 403.

Upper, left, and right portions of the flange-side projecting portion 405 are located outside the rear wall surface portion 403. A front portion of the circumferential wall surface portion 402 and a front portion of the flange-side projecting portion 405 located outside the rear wall surface portion 403 are coupled to each other in an outer wall portion 406. The outer wall portion 406 has a curved slope shape convexing in a direction away from the crankshaft 5. In the flywheel housing 7, a lower portion of the flywheel accommodating part 401 protrudes from the flange-side projecting portion 405 in a direction away from the crankshaft 5.

A space between the rear wall surface portion 403 and an end surface of the flange-side projecting portion 405 in a side view defines a housing-side gear casing 407. This flange-side gear casing 407 and the above-mentioned block-side gear casing 322 constitute the gear case 330.

Inside the flywheel housing 7, a weight-reduction space 408 is formed between an outer wall of the circumferential wall surface portion 402 of the flywheel accommodating part 401 and an inner wall of the outer wall portion 406. A plurality of ribs 409 configured to couple the circumferential wall surface portion 402 to the outer wall portion 406 are disposed in the weight-reduction space 408 The flywheel 7 has a starter attaching part 411 having a starter attachment pedestal 410 that is flush with the flange-side projecting portion 405. The starter attachment pedestal 410 is coupled to the circumferential wall surface portion 402 and the flange-side projecting portion 405 at a location outside the housing-side projecting portion 405. The starter attaching part 411 has a through hole 412 bored from the starter attachment pedestal 410 to the inner wall of the circumferential wall surface portion 402. The flywheel housing 7 is fastened to the front surface 303 side of the cylinder block 6 with bolts in thirteen bolt holes 351 of the block-side projecting portion 321 of the cylinder block 6 and in bolt holes 353 of two housing bolting boss portions 352 of the front surface 303.

As shown in FIG. 10, FIG. 12, FIG. 13, and FIG. 17, the left housing bracket portion 304 of the cylinder block 6 has its peripheral edge portion recessed toward a peripheral edge portion of the flywheel housing 7, to form a recessed portion 325 having a recessed shape. While the flywheel housing 7 is fixed to the cylinder block 6, the starter 20 is disposed to the starter attachment pedestal 410 of the flywheel housing 7 which is exposed on the lower side of the recessed portion 325. As shown in FIG. 14, an annular ring gear 501 for the starter 20 and a crankshaft pulsar 502 are fixed to the outer circumferential side of the flywheel 8. The ring gear 501 and the crankshaft pulsar 502 are fitted in from opposite sides in a thickness direction of the flywheel 8. The starter 20 includes a pinion gear that is disposed in the through hole 412 and is separatably meshed with the ring gear 501.

In the vicinity of the starter attachment pedestal 410, the flywheel housing 7 made of cast iron is fastened with bolts to the block-side projecting portion 321 (see FIG. 12 and FIG. 14) that is provided upright on the peripheral edge portion of the front surface 304*a* of the left housing bracket portion 304. In the cylinder block 6, the left-side fourth reinforcing rib 309 that couples the left housing portion 304 to the left surface 301 is disposed near the recessed portion 325 of the left housing bracket portion 304 which is provided near the starter attachment pedestal 410. Thereby, the rigidity of the starter attachment pedestal 410 and therearound is enhanced. In addition, the recessed portion 325 of the left housing bracket portion 304 and a portion of the block-side projecting portion 321 (see FIG. 12) provided on the front surface 303 and near the starter attachment pedestal 410 so as to be continuous with the recessed portion 325 also enhance the rigidity of the starter attachment pedestal 410 and therearound.

In this embodiment, the starter 20 can be attached to a portion given a high rigidity by the left-side fourth reinforcing rib 309 and the like. Thus, mispositioning and deformation of the starter 20 can be prevented, which may otherwise be caused by distortion of the starter attachment pedestal 410 or the left housing bracket portion 304. Accordingly, breakdown of the starter 20 and poor meshing between the pinion gear of the starter 20 and the ring gear of the flywheel 8 can be prevented.

Figure 19:
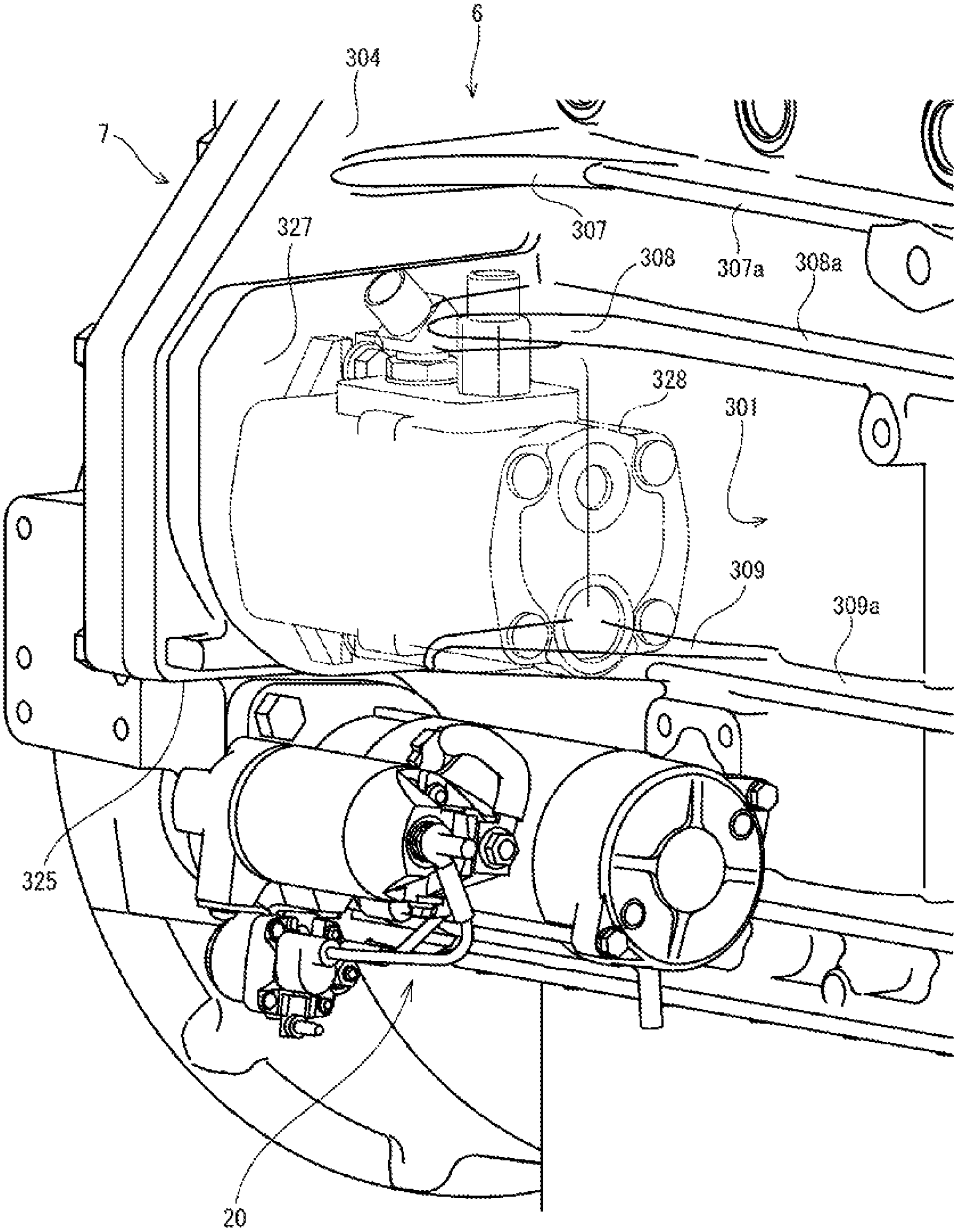

As shown in FIG. 18 and FIG. 19, an external auxiliary machine 328 that is operated in conjunction with rotation of the crankshaft 5 is disposed to an external auxiliary machine attachment pedestal 327 of the left housing bracket portion 304 of the cylinder block 6. The external auxiliary machine 328 is, for example, a work machine pump used in a work machine to which the engine 1 is mounted. The external auxiliary machine 328 is meshed with the cam gear 332 (see FIG. 12), and is actuated by rotation of an auxiliary machine gear (not shown) which is in conjunction with rotation of the crankshaft 5. The left-side third reinforcing rib 308 and the left-side fourth reinforcing rib 309 are disposed near the external auxiliary machine attachment pedestal 327. Since reinforcing ribs 308, 309 enhances the rigidity of the external auxiliary machine attachment pedestal 327, mispositioning and malfunction of the external auxiliary machine 328 can be prevented, which may otherwise be caused by distortion of the external auxiliary machine attachment pedestal 327.

The configurations of respective parts of the present invention are not limited to those of the illustrated embodiment, but can be variously changed without departing from the gist of the invention.

REFERENCE SIGNS LIST

1 engine
5 crankshaft
6 cylinder block
15 fuel feed pump (auxiliary machine)
20 starter (auxiliary machine)
300 crankshaft center
301 left surface (side portion)
302 right surface (one side portion)
304 left side housing bracket (projecting portion)
305 right side housing bracket (projecting portion)
306, 307, 308, 309, 310, 311 reinforcing ribs
307*a*, 308*a*, 309*a*, 311*a* linear portions of reinforcing ribs
310, 311 reinforcing ribs
311*a* linear portions of reinforcing ribs
313 camshaft
314 camshaft casing
315 lubricant sucking passage (part of lubricating oil passage)
316 lubricant supply passage (part of lubricating oil passage)
328 external auxiliary machine (auxiliary machine)

The invention claimed is:

1. A cylinder block structure for an engine device including a cylinder block, wherein:
side surfaces of the cylinder block have reinforcing ribs including a first reinforcing rib and a second reinforcing rib,
a plurality of mount attachment pedestals configured to attach to an engine mount are provided on the side surfaces of the cylinder block,
the engine mount is configured to couple the engine device to a vehicle body,
the reinforcing ribs are coupled to the side surfaces of the cylinder block and to the plurality of mount attachment pedestals,
the cylinder block includes a mounting portion configured to be attached to a flywheel housing,
the first reinforcing rib and the second reinforcing rib each extend from the mounting portion, and
the first reinforcing rib is disposed adjacent to the second reinforcing rib.

2. The cylinder block structure according to claim 1, wherein:
a camshaft casing for accommodating a camshaft is provided inside the cylinder block and is arranged at a position adjacent to a first side surface of the side surfaces of the cylinder block, along a crankshaft axial direction; and
the reinforcing ribs are arranged adjacent to a position where the camshaft casing is disposed in a side view, on the first side surface.

3. The cylinder block structure according to claim 2, wherein the reinforcing ribs are arranged so as to overlap a position where the camshaft casing is disposed in a side view.

4. The cylinder block structure according to claim 2, wherein each of the reinforcing ribs extends along the crankshaft axial direction to a position close to another end opposite to the one end of the cylinder block relative to the crankshaft axial direction.

5. The cylinder block structure according to claim 1, wherein:
the side surfaces of the cylinder block along a crankshaft axial direction have, on one of their ends relative to the crankshaft axial direction, projecting portions protruding in a direction away from a crankshaft supported by the cylinder block;
an auxiliary machine is attached to projecting portions, and the reinforcing ribs are arranged immediately below the auxiliary machine; and
a fuel feed pump secured to a projecting portion of the cylinder block structure, the fuel feed pump proximate to a first reinforcing rib of the reinforcing ribs, the first reinforcing rib coupled to a projecting portion of the cylinder block structure.

6. The cylinder block structure according to claim 1, wherein a lubricating oil passage is provided in the cylinder block, and a part thereof is disposed in a position adjacent to a first side surface of the side surfaces, and the reinforcing ribs and the mount attachment pedestals are arranged adjacent to a position where the part of the lubricating oil passage is disposed in a side view.

7. The cylinder block structure according to claim 6, wherein the reinforcing ribs and the part of the lubricating oil passage extend in a direction along a crankshaft axial direction.

8. The cylinder block structure according to claim 6, wherein the mount attachment pedestals are arranged so as to overlap a position where the part of the lubricating oil passage is disposed in a side view.

9. The cylinder block structure according to claim 6, wherein:

the side surfaces of the cylinder block along a crankshaft axial direction have, on one of their ends relative to the crankshaft axial direction, projecting portions protruding in a direction away from a crankshaft supported by the cylinder block; and an auxiliary machine is attached to the projecting portions, and the reinforcing ribs are arranged immediately below the auxiliary machine.

10. The cylinder block structure according to claim 6, wherein the lubricating oil passage extends along the first side surface, the lubricating oil passage independent of the mount attachment pedestals.

11. The cylinder block structure according to claim 1, wherein:

the cylinder block pivotally supports a crankshaft so that the crankshaft is rotatable; and the reinforcing ribs comprise:

a first set of reinforcing ribs, the first set of reinforcing ribs coupled to the plurality of mount attachment pedestals, a second set of reinforcing ribs, the second set of reinforcing ribs positioned adjacent to a camshaft casing, and a third set of reinforcing ribs, the third set of reinforcing ribs coupled to projecting portions protruding in a direction away from a crankshaft supported by the cylinder block.

12. The cylinder block structure according to claim 1, wherein the side surfaces of the cylinder block include opposite side surfaces of the cylinder block along a crankshaft axial direction, the opposite side surfaces having, on one of their ends relative to the crankshaft axial direction, projecting portions protruding in a direction away from a crankshaft supported by the cylinder block.

13. The cylinder block structure according to claim 12, wherein the opposite side surfaces of the cylinder block along the crankshaft axial direction further have the reinforcing ribs provided between side walls and the projecting portions of the opposite side surfaces so that the reinforcing ribs are flared at their sides close to the corresponding projecting portions.

14. The cylinder block structure according to claim 13, wherein each of the reinforcing ribs extends along the crankshaft axial direction to a position close to another end opposite to the one end of the cylinder block relative to the crankshaft axial direction, and is coupled with the plurality of mount attachment pedestals.

15. The cylinder block structure according to claim 13, wherein the projecting portions and the reinforcing ribs are integrally formed with the cylinder block.

16. The cylinder block structure according to claim 15, wherein the plurality of mount attachment pedestals are provided on the opposite side surfaces of the cylinder block.

17. The cylinder block structure according to claim 16, wherein each of the reinforcing ribs extends along the crankshaft axial direction to a position close to another end opposite to the one end of the cylinder block relative to the crankshaft axial direction, and is coupled with the plurality of mount attachment pedestals.

18. The cylinder block structure according to claim 1, wherein a lubricating oil passage extends along a first side surface of the side surfaces, the lubricating oil passage independent of the mount attachment pedestals.

19. An apparatus comprising: the engine device including the cylinder block of claim 1.

20. The cylinder block structure according to claim 1, wherein the first reinforcing rib extends a greater length than the second reinforcing rib.

* * * * *